US012786678B2

(12) United States Patent
Dave et al.

(10) Patent No.: US 12,786,678 B2

(45) Date of Patent: Nov. 3, 2026

(54) ELECTRONIC DEVICES WITH VISION-ASSISTED RADIO CONTROL

(71) Applicant: Apple Inc., Cupertino, CA (US)

(72) Inventors: Swapnil R Dave, San Jose, CA (US); Vaibhav Chauhan, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 19/038,340

(22) Filed: Jan. 27, 2025

(65) Prior Publication Data

US 2025/0254506 A1 Aug. 7, 2025

Related U.S. Application Data

(60) Provisional application No. 63/548,563, filed on Feb. 1, 2024.

(51) Int. Cl.
*H04W 4/80* (2018.01)
*G06F 3/01* (2006.01)
(Continued)

(52) U.S. Cl.
CPC .............. *H04W 4/80* (2018.02); *G06F 3/013* (2013.01); *G06T 7/70* (2017.01); *H04N 23/90* (2023.01); *G06T 2207/30244* (2013.01)

(58) Field of Classification Search
CPC .. H04W 4/80; G06T 7/70; G06T 2207/30244; H04N 23/90; G06F 3/013
See application file for complete search history.

(56) References Cited

U.S. PATENT DOCUMENTS 10,528,130 B2 1/2020 Maltz
10,802,582 B1 10/2020 Clements
(Continued)

FOREIGN PATENT DOCUMENTS

CN 101890719 A 11/2010
CN 115776661 A 3/2023
(Continued)

OTHER PUBLICATIONS

U.S. Appl. No. 18/639,269, filed Apr. 18, 2024.
(Continued)

*Primary Examiner* — Sunghyoun Park
(74) *Attorney, Agent, or Firm* — Treyz Law Group, P.C.; Michael H. Lyons

(57) ABSTRACT

A communications system may include a head-mounted device (HMD) and at least one other device. The HMD may capture camera data from its surroundings. The devices may include radios for wirelessly communicating via corresponding communications links. The HMD may help to adjust one or more of the radios based on the camera data. The adjustments may include transitioning the radio(s) between radio states, controlling how the radio(s) search for other devices, controlling the radio(s) to initiate or end a particular connection, controlling the radio(s) to enter or exit a power-saving mode, disabling or powering off the radio(s), controlling the radio(s) to coordinate video streaming/playback, and/or controlling the radio(s) to coordinate reminders. Leveraging the optical capabilities of the HMD may allow the devices to wirelessly connect to each other in a seamless and efficient manner while also minimizing power consumption by the radios and user interaction with the devices.

20 Claims, 22 Drawing Sheets

(51) Int. Cl.
*G06T 7/70* (2017.01)
*H04N 23/90* (2023.01)

(56) References Cited

U.S. PATENT DOCUMENTS

| | | | |
|---|---|---|---|
| 12,113,955 B2 | 10/2024 | Ruangchan et al. | |
| 2016/0037573 A1 | 2/2016 | Ko et al. | |
| 2018/0284962 A1 | 10/2018 | Ballard et al. | |
| 2021/0022641 A1 | 1/2021 | Siddharth et al. | |
| 2021/0067418 A1 | 3/2021 | Ely et al. | |
| 2022/0043270 A1* | 2/2022 | Zhang .................... | H01Q 1/276 |
| 2022/0334637 A1 | 10/2022 | Sharma et al. | |
| 2024/0338921 A1 | 10/2024 | Burgner et al. | |
| 2024/0370083 A1 | 11/2024 | Nair et al. | |
| 2024/0393996 A1 | 11/2024 | Moore et al. | |
| 2024/0402863 A1 | 12/2024 | Miron et al. | |
| 2025/0004545 A1 | 1/2025 | Wang et al. | |

FOREIGN PATENT DOCUMENTS

| | | |
|---|---|---|
| KR | 101198401 B1 | 11/2012 |
| KR | 101662032 B1 | 10/2016 |
| KR | 102337907 B1 | 12/2021 |

OTHER PUBLICATIONS

U.S. Appl. No. 18/455,880, filed Aug. 25, 2023.
U.S. Appl. No. 18/807,499, filed Aug. 16, 2024.
Sedouram Ramprasad, "Managing Devices in a Device Ecosystem by Detecting Eye Gaze, Gestures, and User Medical Diagnostics", Defensive Publications Series, Jun. 30, 2023, Technical Disclosure Commons.

* cited by examiner

ELECTRONIC DEVICES WITH VISION-ASSISTED RADIO CONTROL

This application claims the benefit of U.S. Provisional Patent Application No. 63/548,563, filed Feb. 1, 2024, which is hereby incorporated by reference herein in its entirety.

FIELD

This disclosure relates generally to wireless communications, including wireless communications performed by electronic devices.

BACKGROUND

Communications systems can include electronic devices with radios that wirelessly communicate using radio-frequency signals. If care is not taken, the radios can use excessive power to establish and maintain a wireless link. In some situations, a radio is manually configured to help establish or maintain the wireless link. However, manually configuring a radio can be time consuming, tedious, and detrimental to a user's experience with an electronic device.

SUMMARY

A communications system may include at least a first device, a second device, and a third device. The first device may be a head-mounted display device. The head-mounted display device may capture camera data from its surroundings. The camera data may include outward facing camera (OFC) data and inward facing camera (IFC) data. The IFC data may be used to identify gaze direction and/or to authenticate a wearer of the head-mounted display device, for example. The OFC data may be used to identify other devices and/or objects around the first and/or second devices, for example.

The devices may include radios for wirelessly communicating with other devices via corresponding communications links. The head-mounted may help to adjust one or more of the radios on one or more of the devices based on the camera data. The adjustments to the radio(s) may include transitioning the radio(s) between radio states, controlling how the radio(s) search for other devices (e.g., to begin, continue, stop, pause, halt, or end radio scan(s) and/or advertisement broadcast(s) for the other devices), controlling the radio(s) to initiate or end a particular connection with another device, controlling the radio(s) to enter or exit a power-saving mode, disabling or powering off the radio(s), controlling the radio(s) to coordinate video streaming/playback and/or cursor/keyboard control between multiple display devices, and/or controlling the radio(s) to coordinate reminders based on the captured camera data, as examples. Leveraging the optical capabilities of the head-mounted display device may allow the devices to wirelessly connect to each other in a seamless and efficient manner, while also minimizing power consumption by the radios (e.g., by preventing the radios from performing unnecessary searches) and minimizing user interaction with the devices.

An aspect of the disclosure provides a head-mounted device. The head-mounted device can include a head-mounted support structure. The head-mounted device can include a display in the head-mounted support structure and configured to display an image. The head-mounted device can include one or more cameras in the head-mounted support structure and configured to generate camera data. The head-mounted device can include a first radio in the head-mounted support structure and configured to adjust, based on the camera data, a second radio on an electronic device that is wirelessly connected to the head-mounted device.

An aspect of the disclosure provides a head-mounted device having a front and a rear. The head-mounted device can include a head-mounted support structure. The head-mounted device can include a display in the head-mounted support structure and configured to display an image to an eye box at the rear. The head-mounted device can include a camera in the head-mounted support structure and configured to generate camera data. The head-mounted device can include an antenna. The head-mounted device can include a radio communicatively coupled to the antenna and configured to convey wireless data over the antenna. The head-mounted device can include one or more processors configured to adjust the radio based on the camera data.

An aspect of the disclosure provides a method of operating an electronic device. The method can include receiving, using the antenna, a signal from a head-mounted display device, the signal being generated by the head-mounted display device based on camera data captured by the head-mounted display device. The method can include using one or more processors, adjusting, based on the signal, a search performed by the radio for an additional electronic device to wirelessly connect to the radio.

An aspect of the disclosure provides a method of operating a wireless earbud. The method can include establishing, using a radio, a first communications link with a first electronic device and a second communications link with a second electronic device. The method can include conveying, using the radio, wireless data with the first electronic device over the first communications link. The method can include performing, using the radio, a scan for the second electronic device while the first communications link is active. The method can include receiving, using an antenna, a signal from a head-mounted display device that is different from the first electronic device and the second electronic device. The method can include stopping, using the radio, the scan based on the signal received from the head-mounted display device.

DETAILED DESCRIPTION

Figure 1:
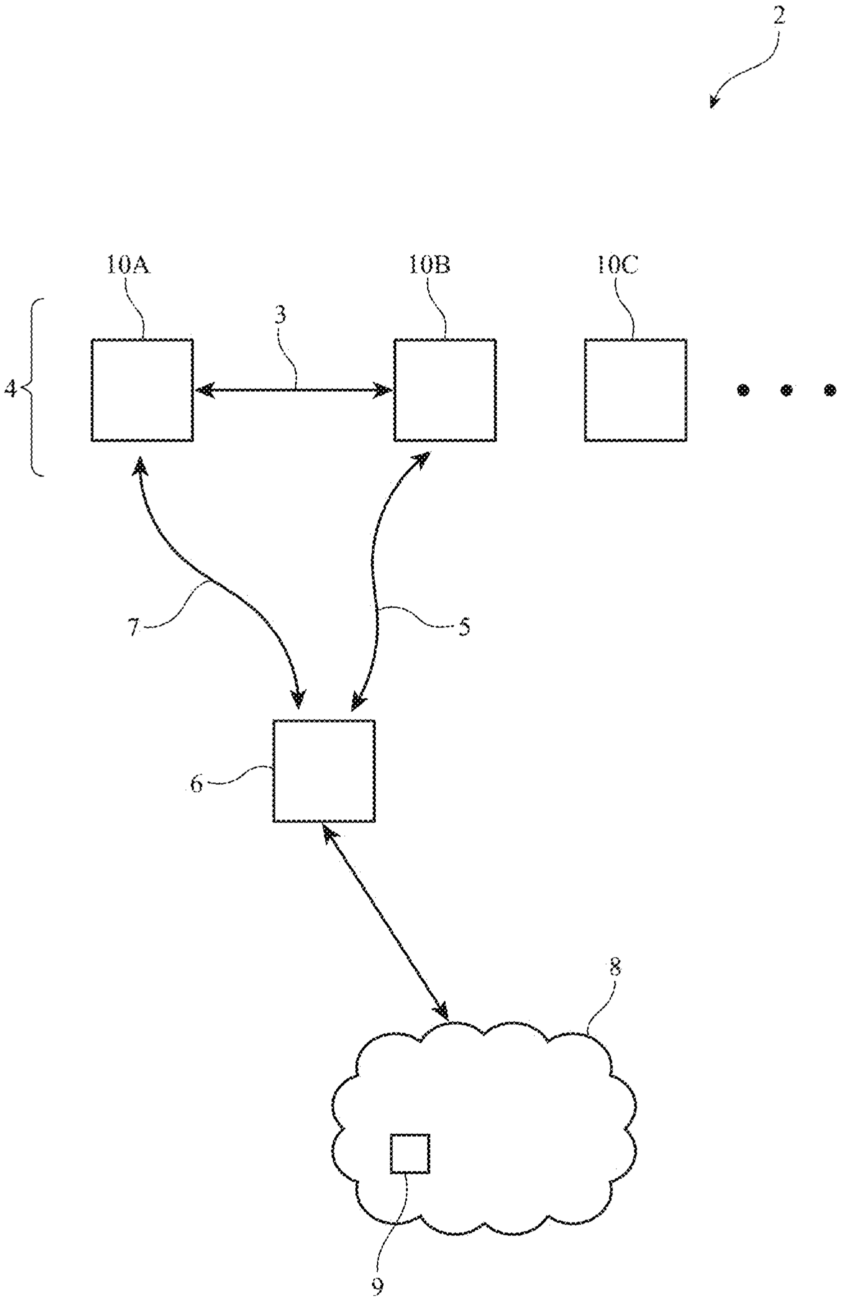
FIG. 1 is a diagram of an illustrative communications system of electronic devices in accordance with some embodiments.

FIG. 1 is a diagram of an illustrative communications system 2. Communications system 2 (sometimes referred to herein as communications network 2, network 2, or system 2) includes a set 4 of user equipment (UE) devices such as devices 10. The devices 10 in set 4 may each be owned, operated, possessed, controlled, and/or otherwise associated with a corresponding user (e.g., an end user of devices 10). Set 4 may include at least a first device 10A, a second device 10B, and a third device 10C (e.g., devices belonging to the same user, users, organization, or entity). In the example of FIG. 1, set 4 includes only a single device 10C and a single device 10B. In practice, set 4 may include more than one device 10C, no devices 10C, or more than one device 10B. If desired, set 4 may include only device 10A (e.g., devices 10B and 10C may be omitted from set 4).

Communications system 2 also includes wireless communications equipment 6 that is not a part of set 4. Communications system 2 further includes a network 8 that is coupled to wireless communications equipment 6 over one or more wired and/or wireless links. Wireless communications equipment 6 may communicatively couple the devices 10 in set 4 to network 8 (e.g., may serve as a communications interface, switch, router, and/or relay between set 4 and network 8). Wireless communications equipment 6 may include, for example, one or more wireless base stations of a cellular telephone network, one or more wireless access points of a wireless local area network (WLAN) (e.g., one or more wireless routers), one or more communications satellites in orbit around Earth, and/or one or more user equipment devices not belonging to set 4, as examples.

Network 8 may include any desired number of network nodes, terminals, and/or end hosts that are communicably coupled together using communications paths that include wired and/or wireless links. The wired links may include cables (e.g., ethernet cables, optical fibers or other optical cables that convey signals using light, telephone cables, radio-frequency cables such as coaxial cables or other transmission lines, etc.). The wireless links may include short range wireless communications links that operate over a range of inches, feet, or tens of feet, medium range wireless communications links that operate over a range of hundreds of feet, thousands of feet, miles, or tens of miles, and/or long range wireless communications links that operate over a range of hundreds or thousands of miles.

The nodes of network 8 may be organized into one or more relay networks, mesh networks, local area networks (LANs), wireless local area networks (WLANs), ring networks (e.g., optical rings), cloud networks, virtual/logical networks, the Internet (e.g., may be communicably coupled to each other over the Internet), combinations of these, and/or using any other desired network topologies. The network nodes, terminals, and/or end hosts of network 8 may include network switches, network routers, optical add-drop multiplexers, other multiplexers, repeaters, modems, portals, gateways, servers, network cards (line cards), wireless access points, wireless base stations, and/or any other desired network components. The network nodes in network 8 may include physical components such as electronic devices, servers, computers, network racks, line cards, user equipment, etc., and/or may include virtual components that are logically defined in software and that are distributed across (over) two or more underlying physical devices (e.g., in a cloud network configuration).

Device 10A may be wirelessly connected to device 10B over wireless communications link 3. Device 10A may be registered and/or paired with device 10B (e.g., during an initial configuration or setup operation). Device 10A may transmit radio-frequency signals to device 10B and/or device 10B may transmit radio-frequency signals to device 10A to support communications link 3. Device 10A and/or device 10B may also communicate with one or more of devices 10C over corresponding wireless communications links (not shown in FIG. 1 for the sake of clarity).

Communications link 3, radio-frequency signals 7, and radio-frequency signals 5 may be associated with the same radio access technology (RAT) or may be associated with different RATs. Radio-frequency signals 7 and 5 may be cellular telephone signals, WLAN signals, WPAN signals, or any other desired radio-frequency signals. Communications link 3 may be a wireless local area network (WLAN) link, a wireless personal area network (WPAN) link such as a Bluetooth link or an ultra-low-latency audio (ULLA) link, a device-to-device (D2D) signal link, a cellular sideband link, or any other desired wireless communications link (e.g., radio-frequency signals of communications link 3 may be WLAN signals, WPAN signals, D2D signals, cellular sideband signals, etc.).

One or more devices 10 in set 4 may communicate with wireless communications equipment 6 using corresponding wireless communications links. For example, device 10A may convey radio-frequency signals 7 with wireless communications equipment 6 to support a wireless communications link between device 10A and wireless communications equipment 6. As another example, device 10B may convey radio-frequency signals 5 with wireless communications equipment 6 to support a wireless communications link between device 10B and wireless communications equipment 6. One or more of the devices 10C in set 4 may also communicate with wireless communications equipment 6 over respective wireless communications links if desired (not shown in FIG. 1 for the sake of clarity).

Radio-frequency signals transmitted by a device 10 to wireless communications equipment 6 are sometimes referred to herein as uplink (UL) signals. UL signals are transmitted in an UL direction from device 10 to wireless communications equipment 6. The UL signals may convey wireless communications data (e.g., UL data) from device 10 to wireless communications equipment 6. Radio-frequency signals transmitted by wireless communications equipment 6 to a device 10 are sometimes referred to herein as downlink (DL) signals. DL signals are transmitted in a DL direction from wireless communications equipment 60 device 10. The DL signals may convey wireless communications data (e.g., DL data) from wireless communications equipment 6 to device 10.

If desired, one or more of devices 10 may wirelessly communicate with wireless communications equipment 6 without passing communications through any other intervening network nodes in communications system 2 (e.g., devices 10 may communicate directly with wireless communications equipment 6 over-the-air). If desired, a given device 10 may concurrently communicate with multiple base stations in wireless communications equipment 6 (e.g., under a carrier aggregation (CA) scheme).

If desired, one or more of devices 10 may wirelessly communicate with wireless communications equipment 6 through another device 10. In some implementations that are described herein as an example, device 10A communicates with wireless communications equipment 6 through or via device 10B. In this example, wireless data is first transmitted from device 10A to wireless communications equipment 6 over communications link 3 and is then transmitted from device 10B to wireless communications equipment 6 using radio-frequency signals 5. In the reverse direction, wireless data is first transmitted from wireless communications equipment 6 using radio-frequency signals 5 and is then transmitted from device 10B to device 10 over communications link 3. In this example, device 10B serves as a wireless relay or interface between device 10A and wireless communications circuitry 6 and, if desired, device 10A may forego transmission and/or reception of radio-frequency signals 7 with communications circuitry 6. The wireless data conveyed by the nodes of communications system 2 may be organized into symbols, datagrams, packets, frames, and/or any other desired data structures.

Wireless communications equipment 6 and some of network 8 may be operated, controlled, serviced, and/or administered by a corresponding network operator or service provider (e.g., a cellular network operator, internet service provider, etc.) that is different from the user associated with set 4. Device(s) 10 may convey wireless data with another node of network 8 via wireless communications equipment 6 (e.g., wireless communications equipment 6 may route, relay, or forward wireless data between one of devices 10 and another end host of network 8).

If desired, network 8 may also include a core network associated with the manufacturer and/or operating system(s) of the devices 10 in set 4. This entity may be different from the network operator or service provider associated with wireless communications equipment 6 and the user associated with set 4. The core network may include a cloud region associated with devices 10 (e.g., associated with the operating system(s) of devices 10). The cloud region may store a corresponding database 9. Database 9 may include a list of the devices 10 in set 4 (e.g., devices 10 that are associated with and/or registered to a particular user), security information (e.g., cryptographic keys, credentials, etc.), and/or other information.

The devices 10 in set 4 may be any desired electronic devices. Device 10 may be, for example, a laptop computer, a desktop computer, a computer monitor containing an embedded computer, a tablet computer, a cellular telephone, a media player, or other handheld or portable electronic device, a smaller device such as a wristwatch device, a pendant device, an accessory device such as wireless headphones, a wireless earbud/earpiece, gaming controller, or user input device (e.g., a mouse, keyboard, pointing device, etc.), a head-mounted device such as goggles, eyeglasses, a helmet, or other equipment worn on a user's head, or another wearable or miniature device, a television, a computer display (e.g., that does not contain an embedded computer), a gaming device (e.g., a video gaming console), a video streaming or playback device, a video transmitting device, a camera, a navigation device, an embedded system such as a system in which electronic equipment with a display is mounted in a kiosk or automobile, a wireless internet-connected voice-controlled speaker, a home entertainment device, a remote control device, a gaming controller, a peripheral user input device, equipment that implements the functionality of two or more of these devices, or other electronic equipment.

In some implementations that are described herein as an example, device 10A is a head-mounted display device (e.g., a virtual, mixed, extended, or augmented reality headset) and device 10B is a non-head-mounted device such as a cellular telephone. This example is illustrative and non-limiting. In general, device 10B and devices 10C may be any desired types of devices. Device 10A is sometimes also referred to herein as head-mounted device 10A. For the sake of simplicity, device 10A is sometimes referred to herein as first device 10A, device 10B is sometimes referred to herein as second device 10B, and device 10C is sometimes referred to herein as third device 10C.

Portability can be an important factor for wireless devices such as the devices 10 in set 4. Whether devices 10 include cellular telephones, tablets, laptops, headphones, or other types of equipment, devices 10 cater to a variety of operations in which the devices need to wirelessly communicate with one or more remote devices/servers (e.g., nodes of network 8), accessory devices (e.g., one or more devices 10C in set 4), and/or other equipment. The communication modes utilized by devices 10 for a respective application can depend on the underlying radio access technology employed by each device (e.g., Bluetooth, Wi-Fi, cellular, etc.). While each radio access technology has its own benefits and drawbacks, each requires discoverability, connectivity, and reliability to ensure satisfactory levels of wireless performance for the user of set 4. In other words, there is a continuous state transition engine that runs in the background on devices 10 to ensure as smooth and quick a user experience with devices 10 as possible.

Consider one example in which set 4 includes a cellular telephone and a pair of wireless earbuds that the user of set 4 wishes to pair with the cellular telephone using the Bluetooth RAT (e.g., for making voice and/or video calls, listening to audio, etc.). The user must first manually pair the wireless earbuds to the cellular telephone. Then, for each subsequent time the user wishes to re-connect the wireless earbuds to the cellular telephone, the cellular telephone may automatically re-connect the cellular telephone to the wireless earbuds upon a simplified trigger condition such as power on of the wireless earbuds (e.g., without requiring the user to manually re-pair the wireless earbuds to the cellular telephone). However, this type of automatic reconnection requires the cellular telephone to keep its radio active to allow the radio to proactively scan for the wireless earbuds in the hope that the user initiates a re-connection. This causes the radio to continue to consume power scanning for the wireless earbuds, limiting battery life even when the user does not have the wireless earbuds nearby to potentially use with the cellular telephone.

A similar example applies to other RATs such as Wi-Fi, where the cellular telephone keeps its Wi-Fi radio active to continually scan for previously-connected Wi-Fi access points, even if the cellular telephone is at a location that is very far from previously-connected Wi-Fi access points. In some implementations, a geo-tagging algorithm is used in which the cellular telephone first detects its location using a satellite navigation receiver and then only scans for previously-connected Wi-Fi access points that are known to be nearby its detected location. While this can help to reduce power consumption for the Wi-Fi radio by preventing scans when the cellular telephone is not located near previously-connected Wi-Fi access points, the cellular telephone can still consume excessive power operating its satellite navigation receiver to fetch its location prior to determining whether to scan for previously-connected Wi-Fi access points.

To help mitigate these issues, first device 10A may be a head-mounted device and set 4 may leverage the optical capabilities of the head-mounted device to help control the operation of one or more of radios on first device 10A and/or second device 10B. First device 10A may, for example, capture camera data that is used by first device 10A and/or second device 10B to control the operation of one or more radios used in communicating with wireless communications equipment 6 and/or one or more devices 10C. By leveraging the optical capabilities of first device 10A, the user can ensure that first device 10A and/or second device 10B establishes and maintains one or more desired wireless communications links as quickly and efficiently as possible with minimal power consumption (which may maximize device battery life) and with minimal impact to user experience (e.g., without requiring the user to manually reconfigure the radios on first device 10A and/or second device 10B).

Figure 2:
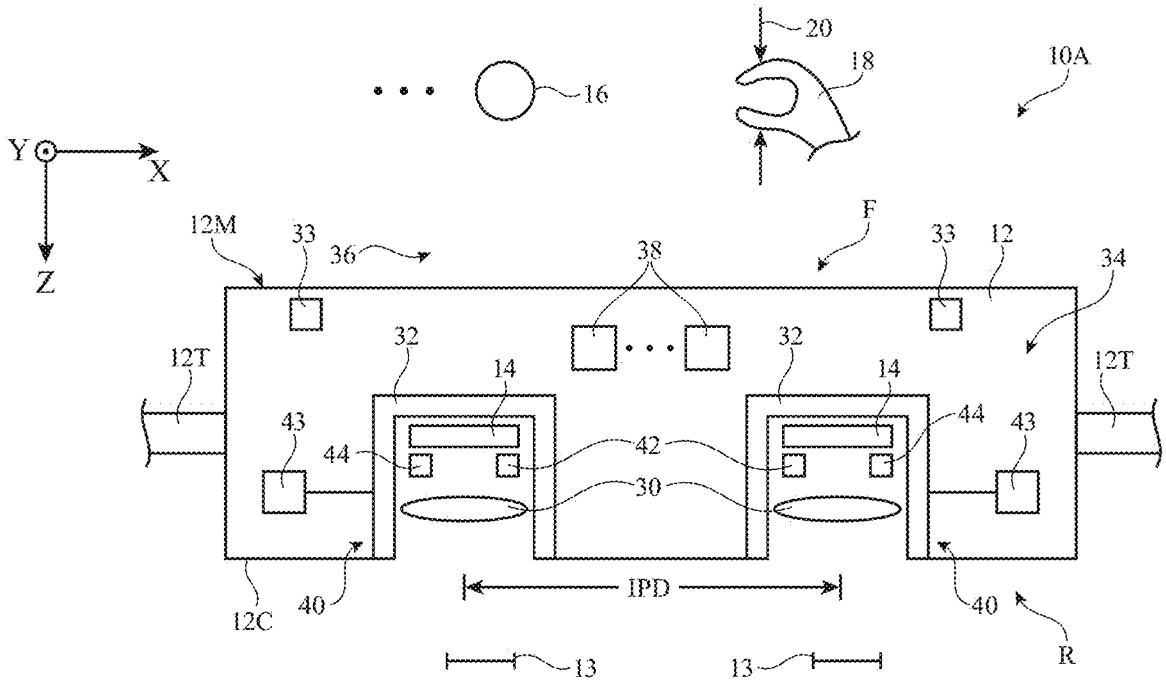
FIG. 2 is a top view of an illustrative head-mounted device in accordance with some embodiments.

FIG. 2 is a top view of first device 10A in implementations where first device 10A is a head-mounted device. As shown in FIG. 2, head-mounted devices such as first device 10A may include head-mounted support structures such as housing 12. Housing 12 may include portions (e.g., support structures 12T) that allow first device 10A to be worn on a wearer's head. Support structures 12T may be formed from fabric, polymer, metal, and/or other material. Support structures 12T may form a strap or other head-mounted support structures to help support first device 10A on a wearer's head. The wearer of first device 10A is sometimes also referred to herein as the user of first device 10A. The wearer may, if desired, be different from a user associated with any one of the devices 10 of set 4 in FIG. 1.

A main support structure (e.g., main housing portion 12M) of housing 12 may support electronic components such as displays 14. Main housing portion 12M may include housing structures formed from metal, polymer, glass, ceramic, and/or other material. For example, housing portion 12M may have housing walls on front face F and housing walls on adjacent top, bottom, left, and right side faces that are formed from rigid polymer or other rigid support structures (e.g., a metal outer chassis) and these rigid walls may optionally be covered with electrical components, fabric, leather, or other soft materials, etc. The walls of housing portion 12M may enclose internal components 38 in interior region 34 of device 10 and may separate interior region 34 from the environment surrounding device 10 (exterior region 36). Internal components 38 may include integrated circuits, actuators, batteries, sensors, interior housing structures of housing 12 (e.g., a metal inner chassis), and/or other circuits and structures for first device 10A. Housing 12 may be configured to be worn on a head of a wearer and may form glasses, a hat, a helmet, goggles, and/or another head-mounted device. Configurations in which housing 12 forms goggles may sometimes be described herein as an example.

Front face F of housing 12 may face outwardly away from a wearer's head and face. Opposing rear face R of housing 12 may face the wearer. Portions of housing 12 (e.g., portions of main housing 12M) on rear face R may form a cover such as cover 12C (sometimes referred to as a curtain). The presence of cover 12C on rear face R may help hide internal housing structures, internal components 38, and other structures in interior region 34 from view by a wearer.

First device 10A may have left and right optical modules 40. Each optical module may include a respective display 14, lens 30, and support structure 32. Support structures 32, which may sometimes be referred to as lens barrels or optical module support structures, may include hollow cylindrical structures with open ends or other supporting structures to house displays 14 and lenses 30. Support structures 32 may, for example, include a left lens barrel that supports a left display 14 and left lens 30 and a right lens barrel that supports a right display 14 and right lens 30.

Displays 14 may include arrays of pixels or other display devices that produce images. Displays 14 may, for example, include organic light-emitting diode pixels formed on substrates with thin-film circuitry and/or formed on semiconductor substrates, pixels formed from crystalline semiconductor dies, liquid crystal display pixels, scanning display devices, and/or other display devices for producing images.

Lenses 30 may each include one or more lens elements for providing image light from displays 14 to respective eyes boxes 13. Lenses 30 may be implemented using refractive glass lens elements, using mirror lens structures (e.g., catadioptric lenses), using Fresnel lenses, using holographic lenses, and/or other lens systems.

When a wearer's eyes are located in eye boxes 13, displays (display panels) 14 operate together to form a display for device 10 (e.g., the images provided by respective left and right optical modules 40 may be viewed by the wearer's eyes in eye boxes 13 so that a stereoscopic image is created for the wearer). In other words, the left image from the left optical module fuses with the right image from a right optical module while the display is viewed by the wearer. The images provided to eye boxes 13 may provide the wearer with a virtual reality environment, an augmented reality environment, and/or a mixed reality environment (e.g., different environments may be used to display different content to the wearer at different times). Although two separate displays 14 are shown in FIG. 1, with one display displaying an image for each of eye boxes 13, this is merely illustrative. A single display 14 may display images to both eye boxes 13, if desired.

It may be desirable to monitor the wearer's eyes while the wearer's eyes are located in eye boxes 13. For example, it may be desirable to use a camera to capture images of the wearer's irises (or other portions of the wearer's eyes) for user authentication. It may also be desirable to monitor the direction (e.g., the location) of the wearer's gaze. Gaze tracking information may be used as a form of user input and/or may be used to determine where, within an image, image content resolution should be locally enhanced in a foveated imaging system. To ensure that device 10 can capture satisfactory eye images while a wearer's eyes are located in eye boxes 13, each optical module 40 may be provided with a gaze tracking system (also referred to as a gaze tracker herein) that includes a camera such as camera 42 and one or more light sources (e.g., light emitters) such as light-emitting diodes 44 (e.g., lasers, lamps, etc.). Multiple cameras 42 may be provided in each optical module 40, if desired. Camera 42 is sometimes also referred to herein as inward facing camera (IFC) 42. IFC 42 captures camera data (e.g., images, image sensor data, video data, etc.) that is sometimes referred to herein as IFC data. The IFC data may include images of features on the wearer's eyes at eye boxes 13 and/or may include images of reflected glints of infrared light that have reflected off the wearer's eyes (sometimes also referred to herein as gaze tracking data or gaze information). Control circuitry on first device 10A may process the IFC data to identify a gaze direction (e.g., a pointing direction, angle, vector, etc.) of the wearer's eyes at eye boxes 13.

IFCs 42 and light-emitting diodes 44 may operate at any suitable wavelengths (visible, infrared, and/or ultraviolet). With an illustrative configuration, which may sometimes be described herein as an example, diodes 44 emit infrared light or near infrared light that is invisible (or nearly invisible) to the wearer, such as near infrared light at 950 nm or 840 nm. This allows eye monitoring operations to be performed continuously without interfering with the wearer's ability to view images on displays 14.

Not all wearers have the same interpupillary distance IPD. To provide device 10 with the ability to adjust the interpupillary spacing between modules 40 along lateral dimension X and thereby adjust the spacing IPD between eye boxes 13 to accommodate different wearer interpupillary distances, device 10 may be provided with actuators 43. Actuators 43 can be manually controlled and/or computer-controlled actuators (e.g., computer-controlled motors) for moving support structures 32 relative to each other. Information on the locations of the wearer's eyes may be gathered using, for example, IFCs 42. The locations of eye boxes 13 can then be adjusted accordingly.

Device 10 may also include sensors on front face F. In the illustrative example of FIG. 1, device 10 includes sensors 33 at front face F. Sensors 33 may be, for example, cameras, light detection and ranging (LIDAR) sensors, radar sensors, ambient light sensors, and/or other suitable sensors. In some illustrative configurations, device 10 may include multiple cameras at front face F to image scenes and objects at the exterior of device 10 (e.g., exterior region 36). These scenes and images may be displayed on displays 14 for a wearer (e.g., as pass-through images), and virtual content may be overlaid onto the scenes and images (e.g., as a mixed reality environment).

Cameras in sensors 33 are sometimes referred to herein as outward facing cameras (OFCs). The OFCs capture camera data (e.g., images, image sensor data, video data, etc.) of the world/scene in front of first device 10A that is sometimes also referred to herein as OFC data. For example, light from real-world objects 16 (e.g., buildings, walls, furniture, the floor, the ceiling, animate objects such as animals or people, inanimate objects, stationary objects, moving objects, vehicles, obstacles, other devices, lights, emitted light, reflected light, etc.) may be incident upon front face F of first device 10A. The OFCs in sensors 33 may generate (capture) OFC data in response to the light from real-world objects 16 (sometimes also referred to herein as external objects 16). This light is sometimes also referred to herein as ambient light, world light, external light, or scene light. The OFC data generated by OFCs in sensors 33 and the IFC data generated by IFCs 42 are sometimes referred to collectively herein as camera data captured by first device 10A. In general, device 10 may include any number of suitable sensors 33 and/or other components at front face F.

First device 10A may receive various types of user input. For example, first device 10A may receive user input from a wireless or wired keyboard, mouse, gamepad, or other peripheral or accessory device that is connected to first device 10A via a wired or wireless connection. In some embodiments, first device 10A may receive user inputs that include the user's gaze direction and/or position (e.g., as captured by IFCs 42). For example, gaze information captured by IFCs 42 may be used to provide a user input to first device 10A to "select" an object visible through displays 14 (e.g., a rendered virtual object produced by displays 14 or an image of an external object 16 as captured by OFCs in sensors 33 and displayed on or passed-through to displays 14) and/or to input text into a web search bar, a text field, a word processor, or other software. To ensure that text may be input discreetly and in the absence of peripheral accessories, a virtual keyboard may be displayed for the user, such as by using displays 14. However, typing traditionally on a virtual keyboard may be difficult, particularly if the virtual keyboard is not projected onto a surface. If desired, the user's gaze (e.g., as captured by IFCs 42) may be used instead of, or in addition to, finger input.

If desired, the user inputs received by first device 10A may also include gesture inputs (e.g., air-gestures). The gesture inputs may, for example, be provided by the hand 18 of the wearer of first device 10A. The wearer of first device 10A may provide a gesture input by, for example, moving two fingers of hand 18 (e.g., a thumb and index finger or other fingers) together, as indicated by arrow 20. In other words, the user may pinch two fingers of hand 18 together, as indicated by arrow 20, to supply a gesture input that is detected by the OFCs of first device 10A.

A camera in first device 10A, such as OFCs in sensors 33, may capture OFC data that includes images of hand 18. If desired, the OFC data may also include three-dimensional depth information that identifies the distance between hand 18 and first device 10A. First device 10A may process the OFC data to identify a particular gesture input, such as the pinching motion shown by arrow 20. First device 10A may combine the detected location of hand 18 relative to one or more real-world objects 16 (e.g., relative to the reference frame of an object in the world) and/or relative to one or more virtual objects displayed by displays 14 (e.g., relative to a reference frame of first device 10A and/or the wearer's head or body) with the detected gesture input to identify a corresponding user input if desired. For example, first device 10A may detect that the user has selected a particular real-world object 16 for further processing by an application on first device 10A when the OFC data indicates that the wearer performed a particular gesture while hand 18 overlapped that real-world object 16 within the field of view of displays 14. As another example, first device 10A may detect that the user has selected a particular virtual object for further processing (e.g., a virtual or on-screen button, menu option, control option, etc.) by an application on first device 10A when the OFC data indicates that the wearer performed a particular gesture while hand 18 overlapped that virtual object within the field of view of displays 14. When the virtual object is a virtual key of a virtual keyboard displayed by displays 14, the user input may be a corresponding text input, for example.

Although FIG. 2 shows the motion of two fingers of hand 18 as forming a corresponding gesture input, this is illustrative and non-limiting. In general, any finger(s) on hand 18 may be used. In some embodiments, different fingers may be used for different inputs. Additionally, although FIG. 2 shows using a single hand 18 for gesture input, this is illustrative and non-limiting. If desired, both of the wearer's hands may be used for a gesture input. Additionally or alternatively, the OFC data may identify user inputs and/or gestures performed by a peripheral or remote device held by hand 18. User inputs to first device 10A that include both a gaze input and a gesture input are described herein as an example (e.g., a user input where the user first gazes at a particular virtual or real world object and then confirms a particular action or user input via a corresponding gesture of hand 18).

Figure 3:
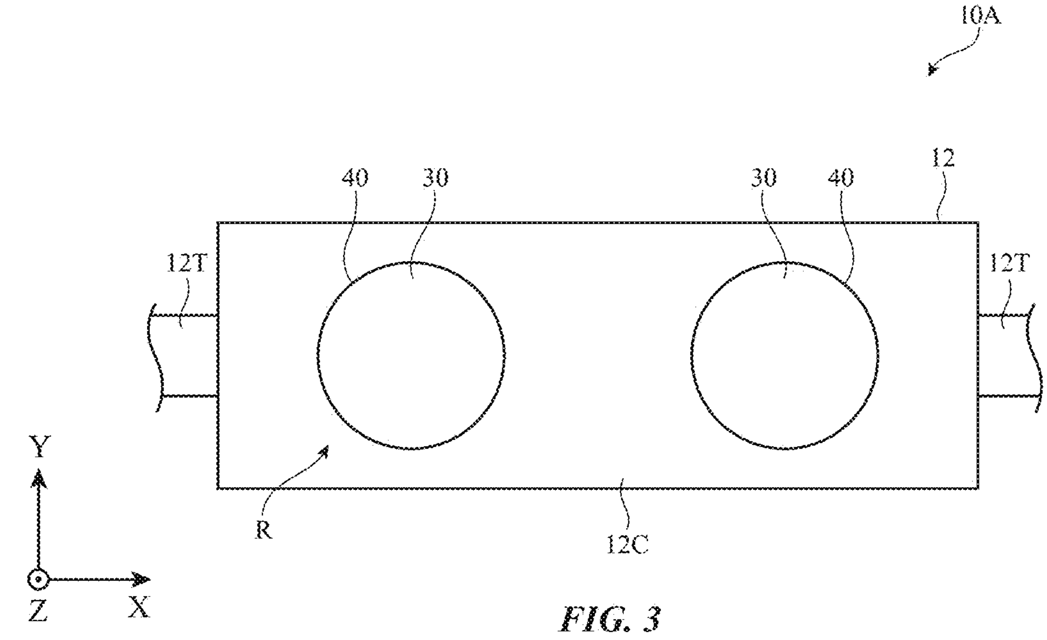
FIG. 3 is a rear view of an illustrative head-mounted device in accordance with some embodiments.

FIG. 3 is a rear view of first device 10A (e.g., as viewed towards rear face R). As shown in FIG. 3, cover 12C may cover rear face R while leaving lenses 30 of optical modules 40 uncovered (e.g., cover 12C may have openings that are aligned with and receive modules 40). As modules 40 are moved relative to each other along dimension X to accommodate different interpupillary distances for different users, modules 40 move relative to fixed housing structures such as the walls of main portion 12M and move relative to each other.

Figure 4:
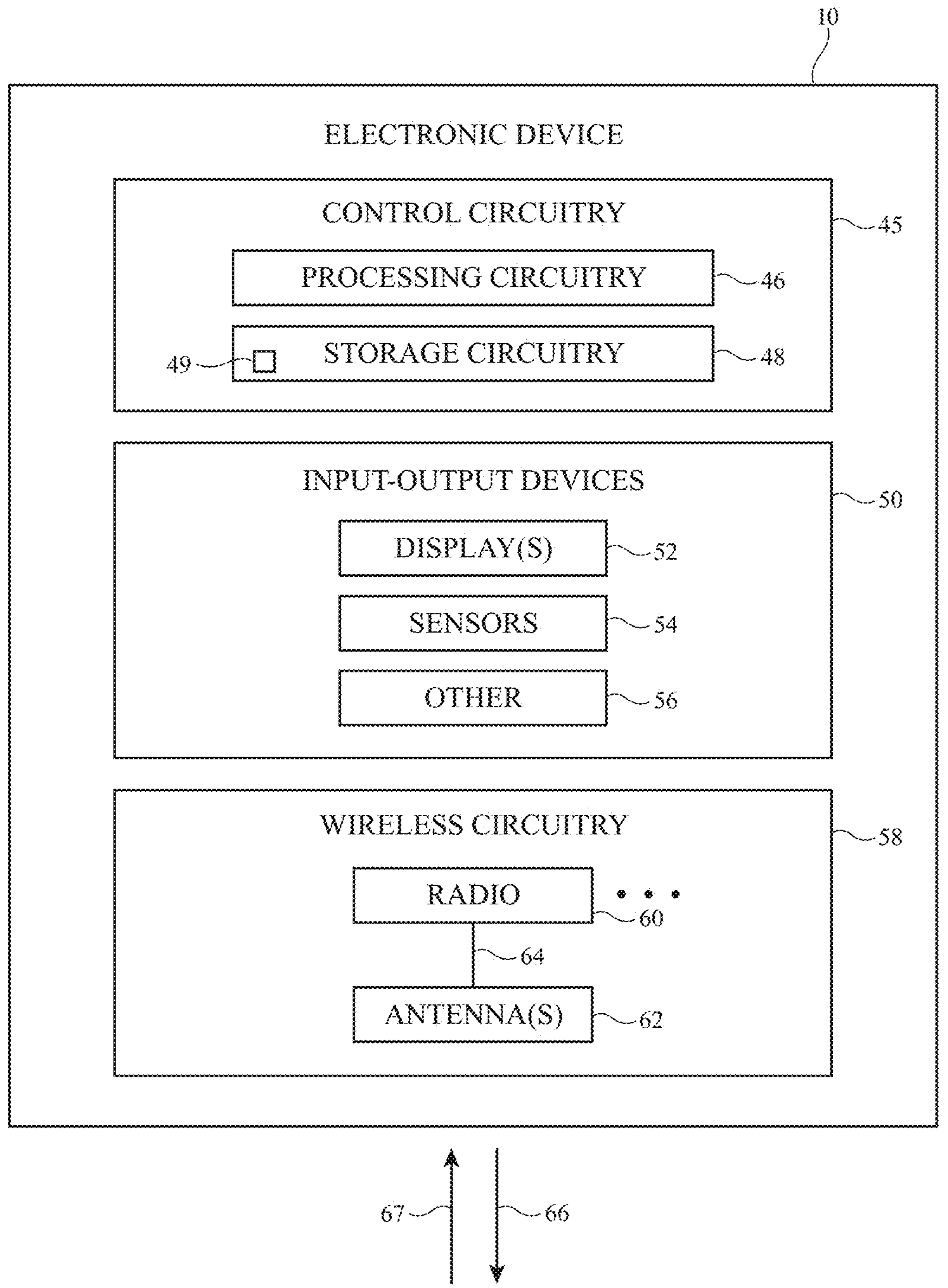
FIG. 4 is a schematic block diagram of an illustrative electronic device having a radio for communicating with other electronic devices of a communications system in accordance with some embodiments.

FIG. 4 is a schematic block diagram of one of the devices 10 in set 4 of FIG. 1. As shown in FIG. 4, device 10 (e.g., first device 10A, second device 10B, or third device 10C of FIG. 1) may include control circuitry 45. Control circuitry 45 may include storage such as storage circuitry 48. Storage circuitry 48 may include hard disk drive storage, nonvolatile memory (e.g., flash memory or other electrically-programmable-read-only memory configured to form a solid-state drive), volatile memory (e.g., static or dynamic random-access-memory), etc. Storage circuitry 48 may include storage that is integrated within device 10 and/or removable storage media.

Storage circuitry 48 may store one or more databases such as device database 49. Device database 49 may include a list of one or more of the other devices 10 in set 4 of FIG. 1 (e.g., a list identifying all of the devices 10 owned by, operated by, and/or registered to the same user, organization, or entity). The list may include, if desired, a list of devices 10 and/or other known devices that device 10 has previously connected to wirelessly (e.g., a list of devices that device 10 has previously paired with via a WPAN or WLAN link). Device database 49 need not be a database and may be implemented using any desired data structure.

Control circuitry 45 may include processing circuitry such as processing circuitry 46. Processing circuitry 46 may be used to control the operation of device 10. Processing circuitry 46 may include on one or more processors such as microprocessors, microcontrollers, digital signal processors, host processors, baseband processor integrated circuits, application specific integrated circuits, central processing units (CPUs), graphics processing units (GPUs), etc. Control circuitry 45 may be configured to perform operations in device 10 using hardware (e.g., dedicated hardware or circuitry), firmware, and/or software. Software code for performing operations in device 10 may be stored on storage circuitry 48 (e.g., storage circuitry 48 may include non-transitory (tangible) computer readable storage media that stores the software code). The software code may sometimes be referred to as program instructions, software, data, instructions, or code. Software code stored on storage circuitry 48 may be executed by processing circuitry 46.

Control circuitry 45 may be used to run software on device 10 such as one or more software applications (sometimes referred to herein simply as applications or apps). The applications may be stored at storage circuitry 48. The applications may include satellite navigation applications, internet browsing applications, voice-over-internet-protocol (VOIP) telephone call applications, video call applications, conferencing applications, email applications, media playback applications, operating system functions, gaming applications, productivity applications, workplace applications, augmented reality (AR) applications, extended reality (XR) applications, virtual reality (VR) applications, mixed reality (MR) applications, reminder applications, scheduling applications, consumer applications, social media applications, educational applications, banking applications, spatial ranging applications, sensing applications, security applications, media applications, streaming applications, automotive applications, video editing applications, image editing applications, rendering applications, simulation applications, camera-based applications, imaging applications, news applications, and/or any other desired software applications. The applications may generate and/or receive corresponding wireless data. Device 10 may include wireless circuitry 58 that transmits and/or receives radio-frequency signals that convey the wireless data with external equipment (e.g., another of the devices 10 in set 4 and/or communications equipment 6 of FIG. 1).

To support interactions with external communications equipment such as other devices 10 and communications equipment 6 of FIG. 1, control circuitry 45 may be used in implementing communications protocols. Communications protocols that may be implemented using control circuitry 45 include internet protocols, wireless local area network (WLAN) protocols (e.g., IEEE 802.11 protocols-sometimes referred to as Wi-Fi®), protocols for other short-range wireless communications links such as the Bluetooth® protocol, a ULLA protocol, or other wireless personal area network (WPAN) protocols, IEEE 802.11ad protocols (e.g., ultra-wideband protocols), cellular telephone protocols (e.g., 3G protocols, 3rd Generation Partnership Project (3GPP) Fourth Generation (4G) Long Term Evolution (LTE) protocols, 3GPP Fifth Generation (5G) New Radio (NR) protocols, 6G protocols, cellular sideband protocols, etc.), device-to-device (D2D) protocols, antenna diversity protocols, satellite navigation system protocols (e.g., global positioning system (GPS) protocols, global navigation satellite system (GLONASS) protocols, etc.), satellite communications protocols (e.g., for conveying bi-directional data with one or more gateways via one or more communications satellites in a satellite constellation), antenna-based spatial ranging protocols, or any other desired communications protocols. Each communications protocol may be associated with a corresponding radio access technology (RAT) that specifies the physical connection methodology used in implementing the protocol (e.g., an NR RAT, an LTE RAT, a 3G RAT, a WPAN RAT, a WLAN RAT, etc.).

Device 10 may also include input-output devices 50. Input-output devices 50 may be used in gathering user input, in gathering information on the environment surrounding the user, and/or in providing a user with output. Input-output devices 50 may include one or more displays such as display(s) 52. Display(s) 52 may include one or more display devices such as organic light-emitting diode display panels (panels with organic light-emitting diode pixels formed on polymer substrates or silicon substrates that contain pixel control circuitry), liquid crystal display panels, microelectromechanical systems displays (e.g., two-dimensional mirror arrays or scanning mirror display devices), display panels having pixel arrays formed from crystalline semiconductor light-emitting diode dies (sometimes referred to as microLEDs), and/or other display devices. In implementations where device 10 of FIG. 4 is first device 10A of FIG. 2, display(s) 52 may include displays 14. In these implementations, first device 10A may also include a front-facing display mounted to main housing portion 12M at front face F (FIG. 2) if desired. The front-facing display may display images such as images and/or renderings of the user's eyes into the environment in front of first device 12A (e.g., through a front cover layer of the device opposite rear face R and eye boxes 13).

Input-output devices 50 may also include sensors 54. Sensors 54 may include force sensors (e.g., strain gauges, capacitive force sensors, resistive force sensors, etc.), audio sensors such as microphones, touch and/or proximity sensors such as capacitive sensors such as a touch sensor that forms a button, trackpad, or other input device), and other sensors. If desired, sensors 54 may include optical sensors such as optical sensors that emit and detect light, ultrasonic sensors, optical touch sensors, optical proximity sensors, and/or other touch sensors and/or proximity sensors, monochromatic and color ambient light sensors, image sensors (e.g., cameras such as OFCs and IFCs), fingerprint sensors, iris scanning sensors, retinal scanning sensors, and other biometric sensors, temperature sensors, sensors for measuring three-dimensional non-contact gestures ("air gestures" by hand 18 of FIG. 2), pressure sensors, sensors for detecting position, orientation, and/or motion (e.g., accelerometers, magnetic sensors such as compass sensors, gyroscopes, and/or inertial measurement units that contain some or all of these sensors), health sensors such as blood oxygen sensors, heart rate sensors, blood flow sensors, and/or other health sensors, radio-frequency sensors, depth sensors (e.g., structured light sensors and/or depth sensors based on stereo imaging devices that capture three-dimensional images), optical sensors such as self-mixing sensors and light detection and ranging (lidar) sensors that gather time-of-flight measurements, humidity sensors, moisture sensors, gaze tracking sensors, electromyography sensors to sense muscle activation, facial sensors, and/or other sensors.

Gaze tracking sensors, facial sensors, iris scanning sensors, and/or retinal scanning sensors in sensors 54 may include IFCs 42 of FIG. 2 and may generate corresponding IFC data, for example. Depth sensors and/or sensors for three-dimensional non-contact gestures ("air gestures" by hand 18 of FIG. 2) may include OFCs in sensors 33 of FIG. 2 and may generate corresponding OFC data, for example. Camera data generated by sensors 54 may include some or all of the IFC data and some or all of the OFC data. In some arrangements, device 10 may use sensors 54 and/or other input-output devices to gather user input. For example, buttons may be used to gather button press input, touch sensors overlapping displays can be used for gathering user touch screen input, touch pads may be used in gathering touch input, microphones may be used for gathering audio input, accelerometers may be used in monitoring when a finger contacts an input surface and may therefore be used to gather finger press input, etc.

If desired, device 10 may include additional components (see, e.g., other devices 56 in input-output devices 50). The additional components may include haptic output devices, actuators for moving movable housing structures, audio output devices such as speakers, light-emitting diodes for status indicators, light sources such as light-emitting diodes that illuminate portions of a housing and/or display structure, other optical output devices, and/or other circuitry for gathering input and/or providing output. Device 10 may also include a battery or other energy storage device, connector ports for supporting wired communication with ancillary equipment and for receiving wired power, and/or other circuitry.

Wireless circuitry 58 supports wireless communications for device 10. Wireless circuitry 58 (sometimes referred to herein as wireless communications circuitry 58) may include one or more antennas 62. Wireless circuitry 58 may also include one or more radios 60. Radio 60 may include circuitry that operates on signals at baseband frequencies (e.g., baseband circuitry) and radio-frequency transceiver circuitry such as one or more radio-frequency transmitters and one or more radio-frequency receivers. A transmitter in radio 60 may include signal generator circuitry, modulation (modulator) circuitry, mixer circuitry for upconverting signals from baseband frequencies to intermediate frequencies and/or radio frequencies, amplifier circuitry such as one or more power amplifiers, digital-to-analog converter (DAC) circuitry, control paths, power supply paths, switching circuitry, filter circuitry, and/or any other circuitry for transmitting radio-frequency signals using antenna(s) 62. A receiver in radio 60 may include demodulation (demodulator) circuitry, mixer circuitry for downconverting signals from intermediate frequencies and/or radio frequencies to baseband frequencies, amplifier circuitry (e.g., one or more low-noise amplifiers (LNAs)), analog-to-digital converter (ADC) circuitry, control paths, power supply paths, signal paths, switching circuitry, filter circuitry, and/or any other circuitry for receiving radio-frequency signals using antenna(s) 62.

The components of radio 60 may be mounted onto a single substrate or integrated into a single integrated circuit, chip, package, or system-on-chip (SOC) or may be distributed between multiple substrates, integrated circuits, chips, packages, or SOCs. Each radio 60 in wireless circuitry 58 may implement a corresponding RAT. If desired, wireless circuitry 58 may include multiple radios 60 that each performs wireless communications using a different respective RAT (e.g., a WLAN radio 60 that conveys radio-frequency signals using antenna(s) 62 according to a WLAN communications protocol, a cellular telephone radio 60 that conveys radio-frequency signals using antenna(s) 62 according to a cellular telephone communications protocol, a WPAN radio 60 that conveys radio-frequency signals using antenna(s) 62 according to a WPAN protocol, etc.).

Antenna(s) 62 may be formed using any desired antenna structures for conveying radio-frequency signals. For example, antenna(s) 62 may include antennas with resonating elements that are formed from loop antenna structures, patch antenna structures, inverted-F antenna structures, slot antenna structures, planar inverted-F antenna structures, helical antenna structures, monopole antenna structures, dipole antenna structures, dielectric resonator antenna structures, hybrids of these designs, etc. Filter circuitry, switching circuitry, impedance matching circuitry, and/or other antenna tuning components may be adjusted to adjust the frequency response and wireless performance of antenna(s) 62 over time. If desired, two or more of antennas 62 may be integrated into a phased antenna array (sometimes referred to herein as a phased array antenna) in which each of the antennas conveys radio-frequency signals with a respective phase and magnitude that is adjusted over time so the radio-frequency signals constructively and destructively interfere to produce a signal beam in a given/selected beam pointing direction.

The term "convey radio-frequency signals" as used herein means the transmission and/or reception of the radio-frequency signals (e.g., for performing unidirectional and/or bidirectional wireless communications with external devices). Similarly, the term "convey wireless data" as used herein means the transmission and/or reception of wireless data using radio-frequency signals (e.g., where the wireless data is modulated onto one or more carriers of the radio-frequency signals). Antenna(s) 62 may transmit the radio-frequency signals by radiating the radio-frequency signals into free space (or to free space through intervening device structures such as a dielectric cover layer). Antenna(s) 62 may additionally or alternatively receive the radio-frequency signals from free space (or from free space through intervening devices structures such as a dielectric cover layer). The transmission and reception of radio-frequency signals by antennas 62 each involve the excitation or resonance of antenna currents on an antenna resonating element in the antenna by the radio-frequency signals within the frequency band(s) of operation of the antenna.

Each radio 60 may be coupled to one or more antennas 62 over one or more radio-frequency transmission lines 64. Radio-frequency transmission lines 64 may include coaxial cables, microstrip transmission lines, stripline transmission lines, edge-coupled microstrip transmission lines, edge-coupled stripline transmission lines, transmission lines formed from combinations of transmission lines of these types, etc. Radio-frequency transmission lines 64 may be integrated into rigid and/or flexible printed circuit boards if desired. One or more radio-frequency lines 64 may be shared between multiple radios 60 if desired. Radio-frequency front end (RFFE) modules (not shown) may be interposed on one or more radio-frequency transmission lines 64. The radio-frequency front end modules may include substrates, integrated circuits, chips, or packages that are separate from radios 60 and may include filter circuitry, switching circuitry, amplifier circuitry, impedance matching circuitry, radio-frequency coupler circuitry, and/or any other desired radio-frequency circuitry for operating on the radio-frequency signals conveyed over radio-frequency transmission lines 64.

Radio 60 may transmit and/or receive radio-frequency signals within corresponding frequency bands at radio frequencies (sometimes referred to herein as communications bands or simply as "bands"). The frequency bands handled by radio 60 may include wireless local area network (WLAN) frequency bands (e.g., Wi-Fi® (IEEE 802.11) or other WLAN communications bands) such as a 2.4 GHz WLAN band (e.g., from 2400 to 2480 MHz), a 5 GHz WLAN band (e.g., from 5180 to 5825 MHz), a Wi-Fi® 6E band (e.g., from 5925-7125 MHz), and/or other Wi-Fi® bands (e.g., from 1875-5160 MHz), wireless personal area network (WPAN) frequency bands such as the 2.4 GHz Bluetooth® band or other WPAN communications bands, cellular telephone frequency bands (e.g., bands from about 600 MHz to about 5 GHZ, 3G bands, 4G LTE bands, 5G New Radio Frequency Range 1 (FR1) bands below 10 GHz, 5G New Radio Frequency Range 2 (FR2) bands between 20 and 60 GHz, cellular sidebands, 6G bands between 100-1000 GHz (e.g., sub-THz, THz, or THF bands), etc.), other centimeter or millimeter wave frequency bands between 10-300 GHz, near-field communications frequency bands (e.g., at 13.56 MHz), satellite navigation frequency bands (e.g., a GPS band from 1565 to 1610 MHz, a Global Navigation Satellite System (GLONASS) band, a BeiDou Navigation Satellite System (BDS) band, etc.), ultra-wideband (UWB) frequency bands that operate under the IEEE 802.15.4 protocol and/or other ultra-wideband communications protocols, communications bands under the family of 3GPP wireless communications standards, communications bands under the IEEE 802.XX family of standards, industrial, scientific, and medical (ISM) bands such as an ISM band between around 900 MHz and 950 MHz or other ISM bands below or above 1 GHz, one or more unlicensed bands, one or more bands reserved for emergency and/or public services, and/or any other desired frequency bands of interest. Wireless circuitry 58 may also be used to perform spatial ranging (e.g., radar) operations if desired.

The example of FIG. 4 is illustrative and non-limiting. While control circuitry 45 is shown separately from wireless circuitry 58 in the example of FIG. 4 for the sake of clarity, wireless circuitry 58 may include processing circuitry (e.g., one or more processors) that forms a part of processing circuitry 46 and/or storage circuitry that forms a part of storage circuitry 48 of control circuitry 45 (e.g., portions of control circuitry 45 may be implemented on wireless circuitry 58). As an example, control circuitry 45 may include baseband circuitry (e.g., one or more baseband processors), digital control circuitry, analog control circuitry, and/or other control circuitry that forms part of radio 60. The baseband circuitry may, for example, access a communication protocol stack on control circuitry 45 (e.g., storage circuitry 48) to: perform user plane functions at a PHY layer, MAC layer, RLC layer, PDCP layer, SDAP layer, and/or PDU layer, and/or to perform control plane functions at the PHY layer, MAC layer, RLC layer, PDCP layer, RRC, layer, and/or non-access stratum (NAS) layer. If desired, the PHY layer operations may additionally or alternatively be performed by radio-frequency (RF) interface circuitry in wireless circuitry 58.

Radio 60 may be operable in one of a set of different operating modes or states (sometimes referred to herein as radio states). In one or more of the states, radio 60 may persistently search for other devices 10 in set 4 to wirelessly connect to. This may, for example, allow radio 60 to quickly and efficiently connect to another device 10 when needed without requiring excessive manual configuration by the user of device 10. For example, when radio 60 is a Bluetooth radio, the radio may search for other Bluetooth-enabled devices that have previously connected to or paired with device 10 (e.g., without requiring the user to manually configure device 10 to re-connect to the Bluetooth-enabled device).

As used herein, a radio performs a "search" for other devices (or "searches" for the other devices) by performing one or more radio scans (sometimes also referred to herein as radio sweeps, frequency scans, or frequency sweeps) and/or by broadcasting advertisement signals. In performing a radio scan, radio 60 receives electromagnetic energy 67 incident upon antenna(s) 62. Radio 60 sweeps over different frequencies associated with its RAT to search the received electromagnetic energy 67 for advertisement signals transmitted by another device 10 using that RAT. The advertisement signals may, for example, have a corresponding waveform dictated by the RAT that is detected (e.g., decoded) by radio 60 in the received electromagnetic energy 67 (e.g., a waveform having a signal magnitude that exceeds a background noise level by at least a predetermined margin). When radio 60 receives an advertisement signal, radio 60 becomes aware of the other device and can wirelessly connect to the other device, establishing a wireless communications link between radio 60 and the other device.

In addition, when searching for other devices, radio 60 may transmit (e.g., broadcast) one or more advertisement signals 66 using antenna(s) 62. Advertisement signals 66 may advertise, to other devices 10 in set 4 (FIG. 1), the presence and availability of device 10 to wirelessly connect using its corresponding RAT. Advertisement signals 66 may have a waveform dictated by the RAT of radio 60. The transmission of advertisement signals 66 is sometimes also referred to herein as "radio advertisement" or "advertisement broadcasting" by radio 60. Advertisement signals 66 are sometimes also referred to herein as advertising signals 66, device advertisement signals 66, advertisements 66, or device advertisements 66.

To minimize the time and user interaction for device 10 to wirelessly connect to another device, radio 60 may continue to perform radio scans over received electromagnetic energy 67 and may continue to broadcast advertisement signals 66 over time (e.g., persistently, continuously, continually, periodically, according to a schedule associated with the RAT, etc.). If care is not taken, such persistent radio scanning and advertisement can cause radio 60 to consume an excessive amount of power in device 10, which may limit battery life for device 10.

Figure 5:
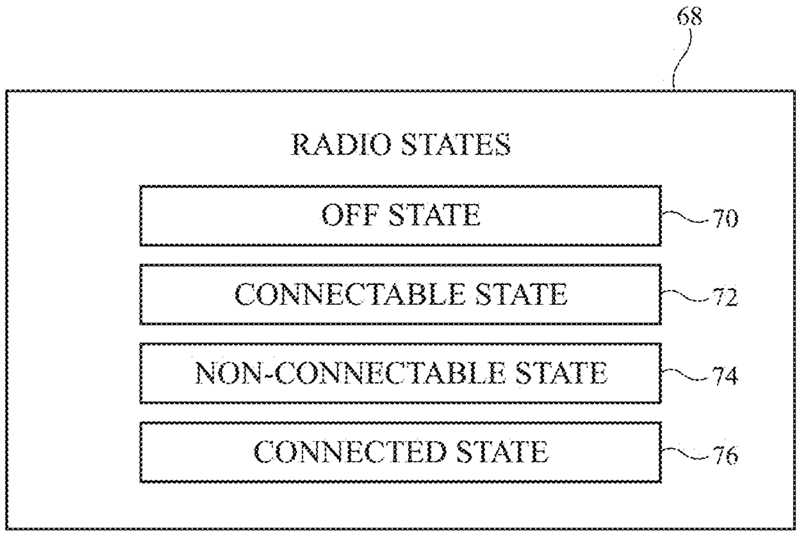
FIG. 5 is a diagram of illustrative radio states for a radio of the type shown in FIG. 4 in accordance with some embodiments.

Radio 60 may perform radio scanning and advertisement in determining when and how to transition between two different radio states. FIG. 5 is a diagram showing illustrative operating states (modes) of radio 60. As shown in FIG. 5, radio 60 may be operable in a set of radio states 68 such as an off state 70, a connectable state 72, a non-connectable state 74, and a connected state 76. Radio 60 may transition between radio states 68 over time depending on the current needs of device 10 in conveying wireless data.

In off state 70, radio 60 is powered off, disabled, inactive, and/or turned off. Radio 60 does not transmit or receive any radio-frequency signals, does not perform radio scans, and does not broadcast advertisement signals 66 while in off state 70. Radio 60 consumes a minimal amount of power in off state 70.

In connectable state 72, radio 60 is powered on and able to establish a wireless communications link with another device. Radio 60 broadcasts advertisement signals 66 (FIG. 4) and listens for advertisement signals in received electromagnetic energy 67 while in connectable state 72. On the other hand, in non-connectable state 74, radio 60 is powered on and able to establish a wireless communications link with another device but does not actively broadcast advertisement signals 66. Radio 60 may listen for advertisement signals in received electromagnetic energy 67 while in non-connectable state 74. When device 10 has wireless data to transmit via radio 60 while in non-connectable state 74, radio 60 may proactively connect to another device 10 that transmitted an advertisement signal received in electromagnetic energy 67 but the other device is not able to do the same to radio 60 because radio 60 foregoes transmission of advertisement signals 66 while in non-connectable state 74.

In connected state 76 (e.g., a radio resource control (RRC) connected mode), radio 60 is powered on and connected to another device (e.g., a communications link is established between radio 60 and the other device). Radio 60 may, for example, perform a handshake procedure with the other device or another connection procedure associated with its RAT to enter connected state 76. Radio 60 conveys wireless communications data with the other device in connected state 76. Radio 60 may transition between radio states 70-76 over time. For example, when device 10 is powered off or in an airplane operating mode, radio 60 may be in off state 70. When device 10 is powered on or exits airplane operating mode, radio 60 may transition to connectable state 72 or non-connectable state 74. Device 10 may perform radio scans and/or may advertisement broadcasts while in connectable state 72 and non-connectable state 74 to search for another device. Once another device is found and there is wireless data to convey between radio 60 and the other device, radio 60 may connect to the other device and transitions to connected state 76.

Radio 60 consumes the most power in connected state 76. Radio 60 still consumes some power while in connectable state 72 and non-connectable state 74 (e.g., as required to listen for advertisement signals in the received electromagnetic energy 67 and/or to transmit advertisement signals 66). Different RATs may have different protocol requirements (e.g., timings, waveforms, etc.) for the transmission of advertisement signals 66 and for performing radio scans. To help minimize power consumption in operating radio 68 while also minimizing impact to user experience, camera data captured by the first device 10A in set 4 (FIG. 1) may be leveraged to control and/or adjust one or more radios 60 on one or more of the devices 10 in set 4 (e.g., to determine when and how to transition the radio(s) between states 72-76 of FIG. 5).

Figure 6:
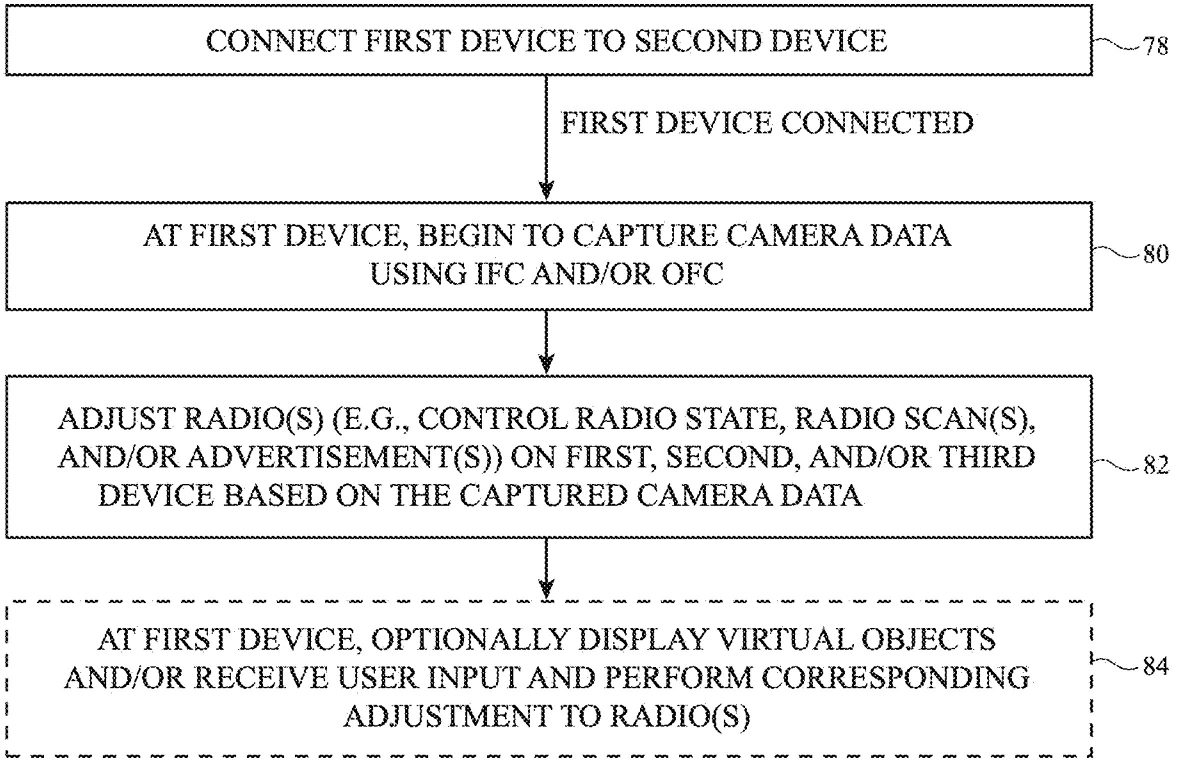
FIG. 6 is a flow chart of illustrative operations involved in adjusting the radio of one or more electronic devices in a communications system based on camera data captured by a head-mounted device in accordance with some embodiments.

FIG. 6 is a flow chart of illustrative operations involved in adjusting the radio 60 of one or more of the devices 10 in set 4 based on camera data captured by first device 10A (FIGS. 1-3). At operation 78, first device 10A wirelessly connects to second device 10B. This may involve the registration or pairing of first device 10A with second device 10B to establish and maintain communications link 3 of FIG. 1. First device 10A and second device 10B may convey wireless data with each other over communications link 3. The wireless data may include streaming audio data, streaming video data, sensor data, camera data captured by one or both devices, control data, and/or any other desired application data. First device 10A and second device 10B may be associated with (e.g., registered to) the user associated with set 4 (e.g., at database 9 of FIG. 1). If desired, set 4 may also include at least one third device 10C associated with (e.g., registered to) the user associated with set 4 (e.g., at database 9 of FIG. 1).

Processing may proceed to operation 80 when a wearer dons first device 10A (e.g., when the wearer places first device 10A on their head such that the wearer's eyes are located at eye boxes 13 of FIG. 2). The wearer may be the user associated with set 4 or another person. At operation 80, first device 10A may begin to capture (e.g., gather, generate, measure, output, produce, etc.) camera data. The camera data may include OFC data captured by one or more OFCs in sensors 33 and/or may include IFC data captured by IFCs 42 (FIG. 2). The OFC data may include images of the real world in front of first device 10A (e.g., real-world objects 16 and/or hand 18 of FIG. 2). The IFC data may include gaze tracking data.

The IFC data and the OFC data (and optionally orientation sensor data gathered by first device 10A) may collectively identify a wearer's gaze direction within the field of view of displays 14 and eye boxes 13 (FIG. 2). The IFC data and the OFC data may, for example, identify that the wearer is gazing on or towards a particular virtual or real-world object (e.g., where the IFC data registers the user's gaze to a particular direction within the field of view of displays 14, and the OFC data and optionally the orientation sensor data registers the displays 14 and thus the user's gaze to a particular direction in the real world in front of first device 10A). First device 10A may continue to capture camera data while processing the remaining operations of FIG. 6 if desired. If desired, first device 10A may transmit some or all of the captured camera data to second device 10B over communications link 3 (FIG. 1).

At operation 82, first device 10A may adjust one or more of the radios 60 (FIG. 4) on first device 10A, second device 10B, and/or one or more of third devices 10C (FIG. 1) based on the camera data captured by first device 10A. For example, first device 10A may adjust the radio(s) 60 by: transitioning the radio(s) between two of states 70-76 of FIG. 5, controlling the radio(s) to search for other devices (e.g., to begin, continue, stop, pause, halt, or end radio scan(s) and/or advertisement broadcast(s) for the other devices), controlling the radio(s) to initiate or end a particular connection with another device, controlling the radio(s) to enter or exit a power-saving mode, disabling or powering off the radio(s), controlling the radio(s) to coordinate video streaming/playback and/or cursor/keyboard control between multiple display devices, and/or controlling the radio(s) to coordinate reminders based on the captured camera data.

The radio adjustment(s) performed at operation 82 may serve to facilitate the transition of the radio(s) between radio states 68 (FIG. 5) and/or may facilitate wireless connection of the radio(s) with other devices in a manner that ensures satisfactory wireless performance while minimizing power consumption by the radio(s) and user interaction with first device 10A and/or second device 10B (which may minimize disruption to user experience). In implementations where first device 10A adjusts its own radio(s) 60, control circuitry 45 (FIG. 4) may provide control signals to the radio(s) to control and/or adjust the operation of the radio(s). In implementations where first device 10A adjusts radio(s) 60 on second device 10B (FIG. 1), first device 10A may transmit a control signal to second device 10B over communications link 3 (FIG. 1) that instructs second device 10B to make the corresponding adjustment to its radio(s) 60. In implementations where first device 10A adjusts radio(s) 60 on a third device 10C (FIG. 1), first device 10A may transmit a control signal to third device 10C over a corresponding communications link between first device 10A and third device 10C or may transmit the control signal to third device 10C via second device 10B (e.g., via communications link 3 and an additional communications link between second device 10B and third device 10C).

At optional operation 84, first device 10A may display one or more virtual objects (e.g., virtual objects or elements of a graphical user interface) on displays 14 (FIG. 2) based on the adjustments performed at operation 82. Additionally or alternatively, first device 10A may receive a user input (e.g., a gaze input identified from the IFC data and/or a gesture input identified from the OFC data). First device 10A may perform one or more further adjustments to one or more radios 60 on first device 10A, second device 10B, and/or one or more of third devices 10C (FIG. 1) based on the received user input.

FIGS. 7-21 describe examples of different radio adjustments that may be performed based on the camera data captured by first device 10A to maintain satisfactory levels of wireless performance while minimizing power consumption and detriment to user experience (e.g., while processing operation 82 of FIG. 6). The examples of FIGS. 7-21 describe implementations in which first device 10A (a head-mounted device) is paired with second device 10B (e.g., a cellular telephone) over communications link 3. This is illustrative and non-limiting. If desired, the examples of FIGS. 7-21 may be adapted to implementations in which second device 10B is omitted from set 4 (FIG. 1) (e.g., in which first device 10A performs radio adjustments without the use of a paired second device 10B).

Figure 7:
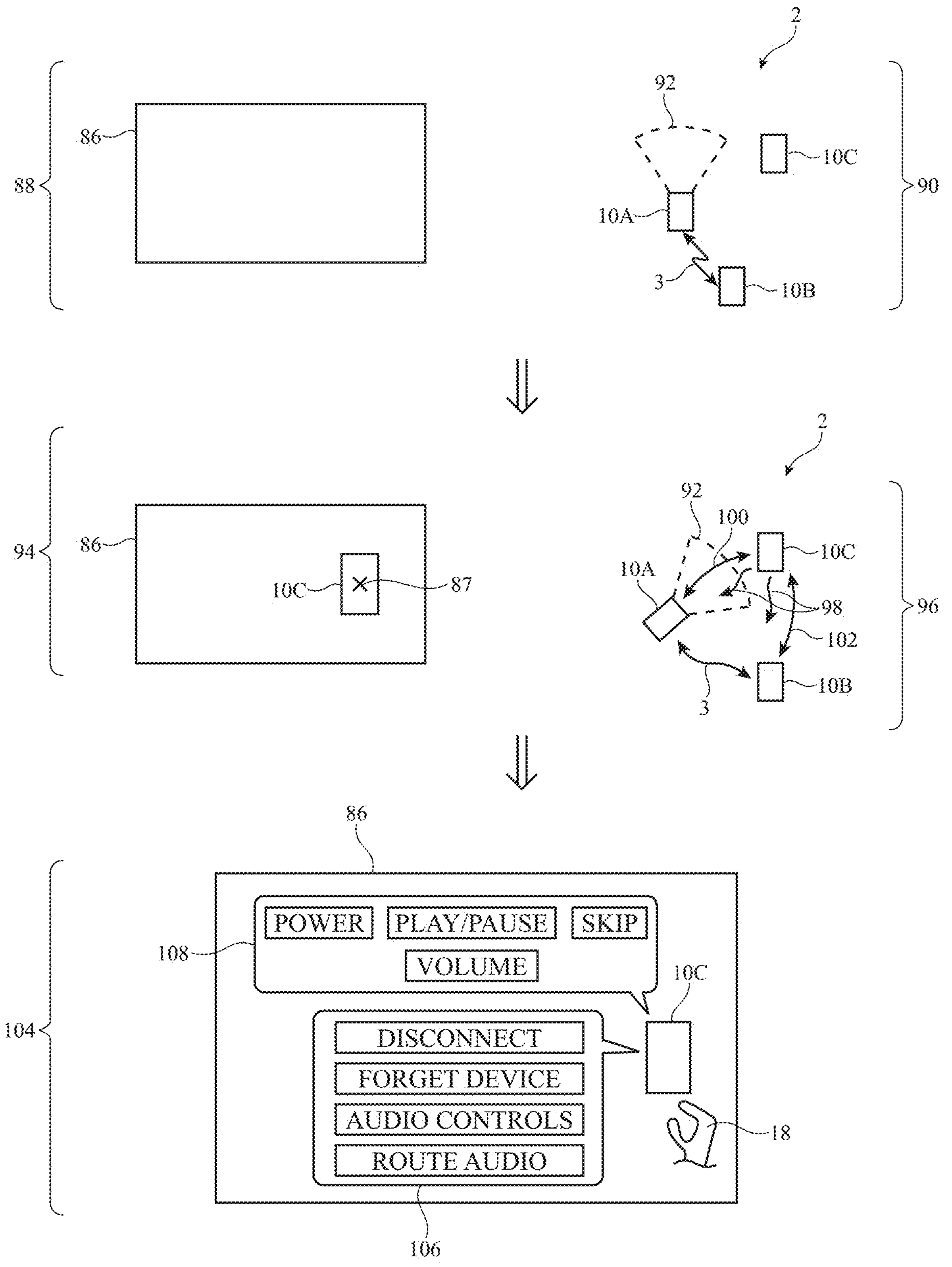
FIG. 7 is a diagram showing how an illustrative head-mounted device may trigger a wireless connection between a radio and another device in accordance with some embodiments.

FIG. 7 is a diagram showing an example in which first device 10A adjusts a radio 60 on second device 10B by instructing the radio 60 on second device 10B to wirelessly connect to a third device 10C based on camera data captured by first device 10A. This operation is sometimes also referred to herein as operating first device 10A in a "focus mode."

In the example of FIG. 7, the optical capabilities of first device 10A are leveraged to help control second device 10B to wirelessly connect to a (e.g., previously un-connected) third device 10C. As one example, third device 10C may be a Bluetooth speaker that the user wishes to wirelessly connect to second device 10B so the user can stream audio from second device 10B for playback over the Bluetooth speaker. This is illustrative and, in general, third device 10C may be any desired device that the user wishes to wirelessly connect to second device 10B.

Portion 90 of FIG. 7 shows communications system 2 at a first time. First device 10A has a field of view (FOV) 92. FOV 92 represents the portion of the FOV of the OFCs in sensor 33 that are passed through and displayed on displays 14 for view by the wearer of first device 10A at eye boxes 13 (FIG. 2). The OFCs in sensor 33 generate OFC data in response to light from real-world objects 16 (FIG. 2) incident from at least within FOV 92.

At the first time, third device 10C is not located within FOV 92. Portion 88 of FIG. 7 shows the image 86 displayed by displays 14 at the first time. Image 86 includes images of real-world objects within FOV 92 (e.g., real-world objects 16 of FIG. 2) captured by the OFCs in sensors 33 and passed through to displays 14. Image 86 may also include virtual images (not shown in FIG. 7) generated by displays 14 and overlaid with images of the real-world objects within FOV 92. The virtual images may include virtual objects or elements of a graphical user interface (GUI) (sometimes also referred to herein as GUI objects or elements), on-screen text, icons, rendered three-dimensional virtual objects, two-dimensional virtual objects, a virtual computer monitor or display screen, a virtual desktop, a virtual keyboard, etc. The image 86 does not include an image of third device 10C as no other devices 10 are within or overlapping FOV 92 at the first time.

Portion 96 of FIG. 7 shows communications system 2 at a second time after the first time. At the second time, the wearer looks at third device 10C while wearing first device 10A. This places third device 10C within FOV 92. Portion 94 of FIG. 7 shows image 86 at the second time. The OFCs on first device 10A capture OFC data that includes images of third device 10C while third device 10C is within FOV 92. Image 86 therefore includes third device 10C at the second time.

While third device 10C is within FOV 92, the wearer of first device 10A may focus their eyes or gaze onto third device 10C. Within FOV 92, the IFC data captured by first device 10A may identify the wearer's gaze direction 87 towards or overlapping third device 10C. The wearer may hold (e.g., focus, direct, orient, etc.) their eyes towards third device 10C for a predetermined time period to indicate that the wearer intends to wirelessly connect second device 10B to third device 10C. In response to the IFC data indicating that the wearer has held their gaze towards third device 10C for the predetermined time period, first device 10A may instruct, via communications link 3, a radio 60 (FIG. 3) on second device 10B to begin or establish a wireless connection with third device 10C.

This may involve instructing the radio on second device 10B to perform one or more radio scans (e.g., scans over Bluetooth frequencies in the example where third device 10C is a Bluetooth speaker) for advertisement signals 98 transmitted by third device 10C and/or to broadcast advertisement signals 66 (FIG. 4) (e.g., according to the Bluetooth protocol). Additionally or alternatively, first device 10A may convey radio-frequency signals directly with third device 10C (e.g., over communications link 100) to instruct a radio 60 on third device 10C to wirelessly connect to second device 10B (e.g., to begin radio scans and/or advertisement broadcasts). The radios 60 in second device 10B and/or third device 10C may be in connectable state 72 or non-connectable state 74 while performing the radio scans and advertisement broadcasts.

Once third device 10C has detected an advertisement signal broadcast by second device 10B (e.g., while performing a corresponding radio scan at third device 10C)) and/or once second device 10B has detected an advertisement signal 98 broadcast by third device 10C (e.g., while performing a corresponding radio scan at second device 10B), second device 10B may establish a wireless communications link 102 with third device 10C (e.g., transitioning the radio from states 72 or 74 of FIG. 5 to connected state 76). Once communications link 102 has been established, second device 10B is sometimes also referred to herein as being connected to, paired with, or communicatively coupled to third device 10C. Second device 10B may then convey wireless data with third device 10C over communications link 102. For example, second device 10B may transmit streaming audio data to third device 10C which then plays the audio data over a speaker.

This may allow second device 10B to automatically connect to third device 10C without requiring the wearer to interact with cumbersome user interface menus to manually configure second device 10B to connect to third device 10C. After second device 10B has connected to third device 10C, the wearer may provide an additional user input to adjust the wireless link between second device 10B and third device 10C and/or to remotely control third device 10C (e.g., while processing operation 84 of FIG. 6).

For example, at third time after the second time (e.g., after third device 10C has already connected to second device 10B), the wearer may once again gaze towards third device 10C. This may place third device 10C within FOV 92. While the wearer's eyes are directed towards third device 10C (e.g., when the IFC data is indicative of the wearer's having a gaze direction 87 overlapping third device 10C), the user may provide a gesture input with hand 18 (e.g., a pinching motion or other gesture with hand 18). The gesture input may be captured in the OFC data generated by first device 10A. Detection of the gesture input in the OFC data, while the IFC data indicates that the wearer is looking at third device 10C, may trigger first device 10A to display virtual objects on displays 14.

Portion 104 of FIG. 7 shows an example of virtual objects that may be included in the image 86 displayed by displays 14 on first device 10A. As shown in portion 104 of FIG. 7, the virtual objects may include GUI elements (e.g., virtual buttons) such as radio connection controls 106 and/or device controls 108. Radio connection controls 106 may include controls for the communications link 102 between second device 10B and third device 10C. For example, connection controls 106 may include a virtual button to disconnect the radio on second device 10B from the radio on third device 10C, a virtual button to forget third device 10C (e.g., to remove third device 10C from a list of previously-paired devices at second device 10B), a virtual button to adjust audio controls associated with communications link 102, and a virtual button to change audio routing settings.

Device controls 108 may include controls that allow the wearer of first device 10A to remotely control third device 10C even when the wearer is located out of arms reach from third device 10C. Device controls 108 may include, for example, virtual buttons corresponding to physical buttons on third device 10C. As examples, device controls 108 may include a virtual button to power off third device 10C, a virtual button to play or pause audio playback at third device 10C, a virtual button to skip an audio track at third device 10C, a virtual button to adjust the volume of audio playback at third device 10C, etc.

The wearer of first device 10A may provide a user input to select the virtual buttons in device controls 108 and/or radio connection controls 106 (e.g., by directing their gaze towards a particular virtual button and performing a gesture with hand 18 to confirm selection of that virtual button). First device 10A may use communications link 3 to instruct second device 10B to adjust its radio according to the corresponding virtual button in radio connection controls 106 selected by the wearer. First device 10A may use wireless link 3 to instruct second device 10B to control third device 10C over communications link 102 according to the corresponding virtual button in device controls 108 selected by the wearer (e.g., using a wireless tunnel between devices 10A and 10C through device 10B). Alternatively, first device 10A may establish a separate communications link 100 between first device 10A and third device 10C and may use communications link 100 to control third device 10C according to the virtual button in device controls 108 selected by the wearer. In this way, the wearer may connect third device 10C to second device 10B and may remotely control third device 10C using camera data captured by first device 10A without requiring the user to interact with cumbersome configuration menus on first device 10A or second device 10B.

Figure 8:
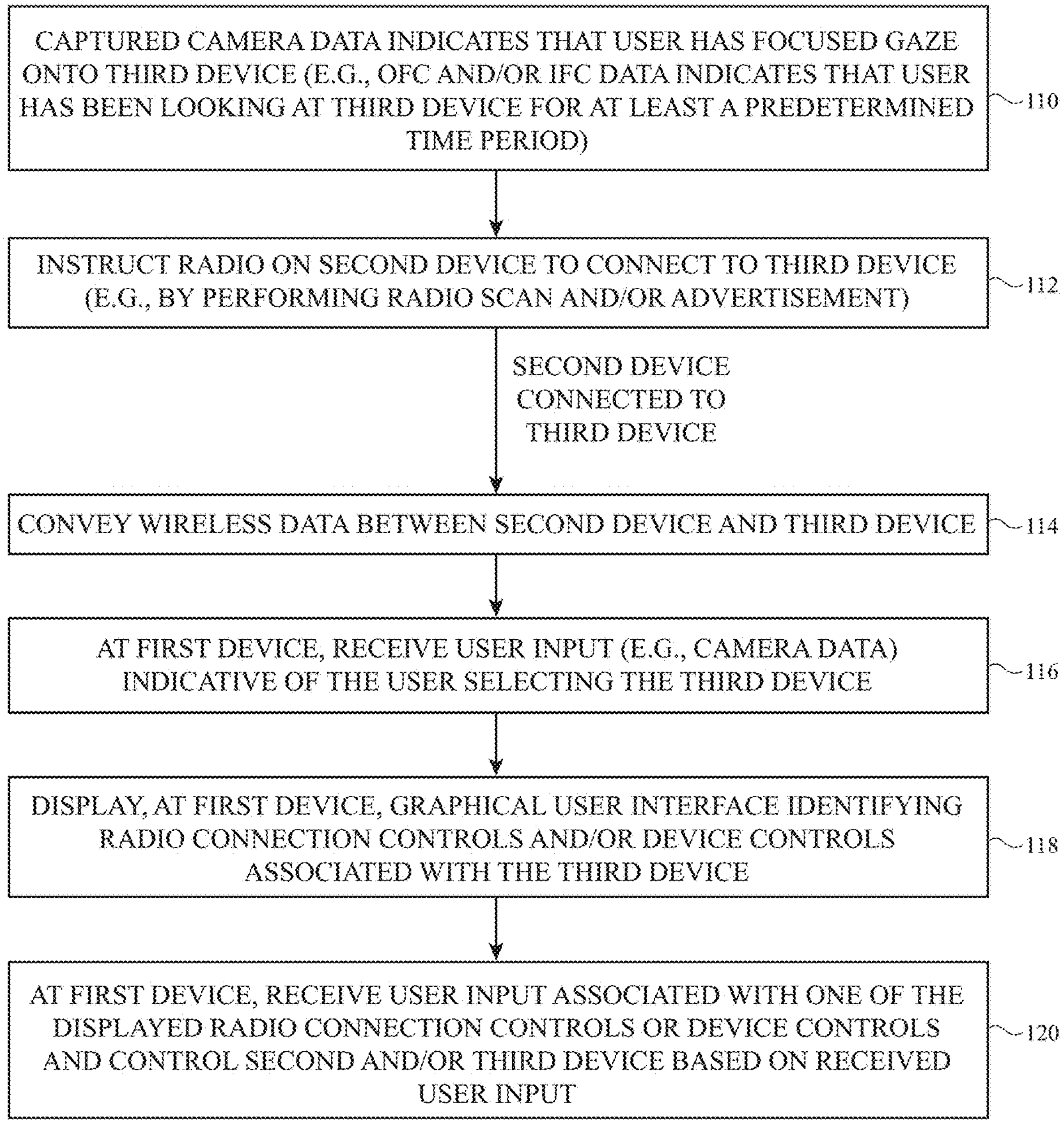
FIG. 8 is a flow chart of illustrative operations involved in using a head-mounted device to trigger a wireless connection between a radio and another device in accordance with some embodiments.

FIG. 8 is a flow chart of operations involved in using first device 10A to instruct the radio 60 on second device 10B to wirelessly connect to third device 10C based on camera data captured by first device 10A (e.g., while operating first device 10A in the focus mode). Operations 110-114 of FIG. 8 may, for example, be performed while processing operation 82 of FIG. 6. Any of operations 116-120 of FIG. 8 may be performed while processing operation 84 of FIG. 6, for example.

At operation 110, first device 10A may capture camera data (e.g., IFC data and/or OFC data) that indicates or identifies that the wearer of first device 10A has focused their gaze onto third device 10C. The camera data may be indicative of the wearer focusing their gaze onto third device 10C when the IFC data and/or the OFC data indicates that the wearer's gaze overlaps third device 10C (see, e.g., gaze direction 87 of FIG. 7) for more than a predetermined time period (e.g., 1 second, 2 seconds, 3 seconds, 1-3 seconds, 0.5-5 seconds, etc.). The predetermined time period may be sufficiently long so as to signify the wearer's intent to focus their gaze onto third device 10C and/or to signify the wearer's intent to connect second device 10B to third device 10C.

At operation 112 (e.g., responsive to the camera data being indicative of the wearer focusing their gaze on third device 10C), first device 10A may use communications link 3 to instruct a radio 60 on second device 10B to connect to third device 10C. This may include, for example, instructing the radio 60 on second device 10B to perform one or more radio scans for advertisement signals 98 (FIG. 7) and/or to broadcast advertisement signals 66 (FIG. 4). Second device 10B may then discover third device 10C based on advertisement signals 98 and/or third device 10C may discover second device 10B based on the advertisement signals transmitted by second device 10B. Once discovered, second device 10B may connect to third device 10C, establishing communications link 102 and transitioning the radio into connected state 76 (FIG. 5).

Once second device 10B has connected to third device 10C, processing proceeds to operation 114. At operation 114, wireless data is conveyed between the radio 60 on second device 10B and third device 10C over communications link 102 (e.g., while communications link 102 is an active link).

At a later time (e.g., while communications link 102 is still active or after communications link 102 has become inactive but while second device 10A is still connected to third device 10B), first device 10A may receive a user input indicative of the wearer selecting third device 10C (at operation 116). For example, first device 10A may capture OFC data and/or IFC data indicative of the user performing a predetermined gesture with hand 18 while gazing towards third device 10C (e.g., while looking in gaze direction 87 of FIG. 7).

At operation 118 (e.g., responsive to receiving the user input), first device 10A may display virtual objects (e.g., GUI elements) such as radio connection controls 106 and/or device controls 108 of FIG. 7.

At operation 120, first device 10A may receive a user input associated with the displayed radio connection controls 106 and/or device controls 108. For example, first device 10A may detect a gaze direction and/or a gesture indicative of the user selecting one of the displayed radio connection controls 106 and/or device controls 108. First device 10A may control second device 10B and/or third device 10C according to the selected one of the displayed radio connection controls 106 and/or device controls 108.

Alternatively, second device 10B may be omitted and the operations of FIG. 8 may be performed to connect first device 10A to third device 10C. In these examples, first device 10A may control its own radio 60 to perform radio scans and/or advertisement broadcasts and to connect to third device 10C. Wireless data may be conveyed between first device 10A and third device 10C (e.g., over communications link 100 of FIG. 7) at operation 114. First device 10A may control its own radio based on the received user input while processing operation 120.

Some types of third device 10C may support concurrent connections with two different devices 10 in set 4 (a procedure sometimes referred to herein as "smart routing"). For example, set 4 may include wireless earbuds that support concurrent Bluetooth or ULLA connections with two other devices. In these situations, the camera data captured by first device 10A may be used to control a radio on the wireless earbuds to stop performing radio scans and/or advertisement broadcasts to help conserve power at the wireless earbuds.

Figure 9:
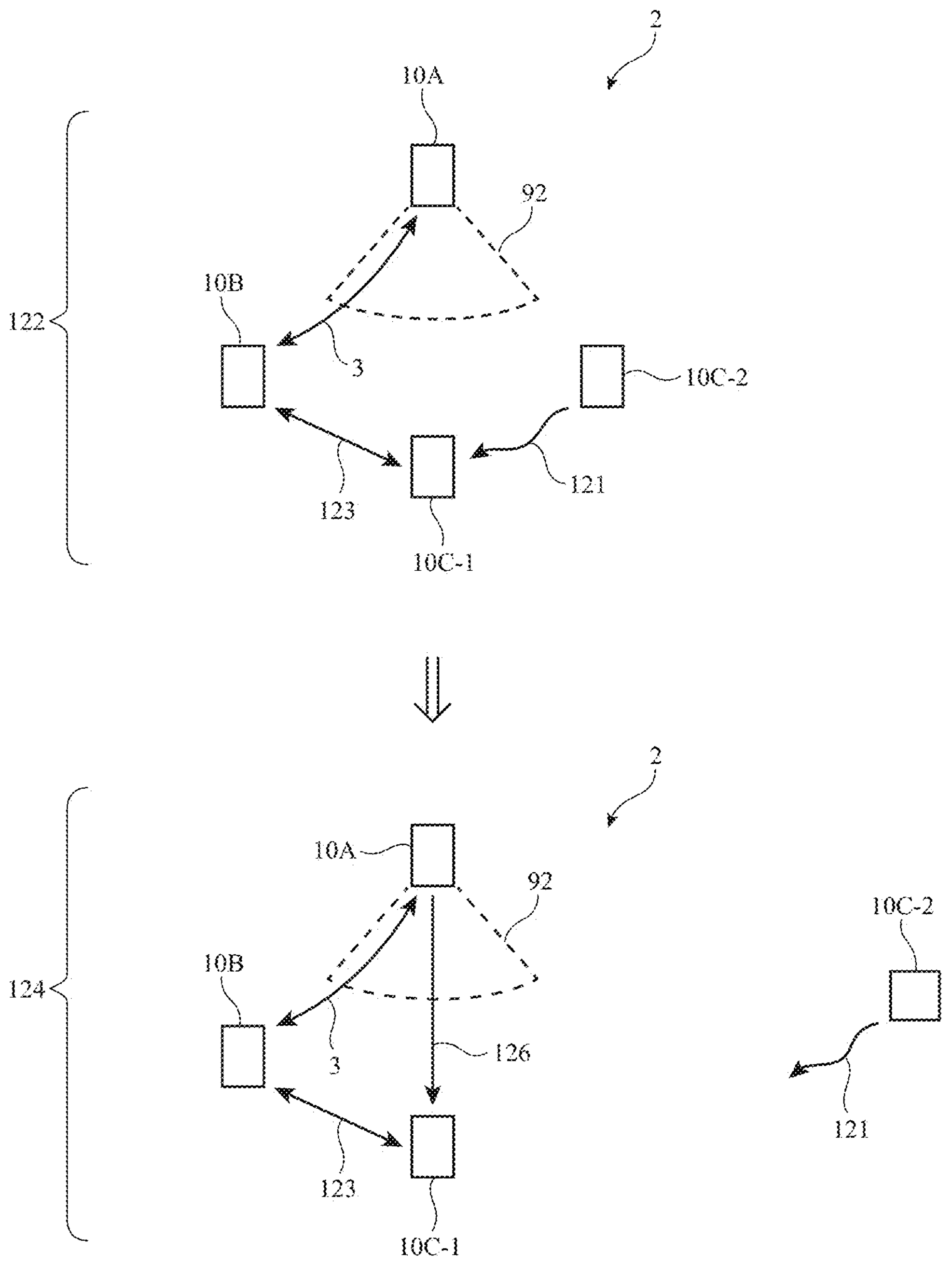
FIG. 9 is a diagram showing how an illustrative head-mounted device may trigger a radio in wireless earbuds to stop scanning for another device in accordance with some embodiments.

FIG. 9 is a diagram showing an example in which camera data captured by first device 10A is used to adjust a radio 60 on wireless earbuds that support concurrent connections with two different devices. As shown in FIG. 9, communications system 2 may include a third device 10C-1 and a fourth device 10C-2. Third device 10C-1 may be wireless earbuds that support concurrent connections with two different devices. Third device 10C-1 is therefore sometimes also referred to herein as wireless earbuds 10C-1. Fourth device 10C-2 may be any desired device 10 (FIG. 4).

Portion 122 of FIG. 9 represents communications system 2 at a first time. Prior to the first time, wireless earbuds 10C-1 are paired with or connected to second device 10B and are paired with or connected to fourth device 10C-2. However, only one of the connections is active at a given time. For example, when the connection between second device 10B and wireless earbuds 10C-1 is active, second device 10B transmits audio data to wireless earbuds 10C-1 for playback and/or wireless earbuds 10C-1 transmit voice data and/or sensor data to second device 10B. When the connection between second device 10B and fourth device 10C-2 is active, fourth device 10C-2 transmits audio data to wireless earbuds 10C-1 for playback and/or wireless earbuds 10C-1 transmit voice data and/or sensor data to fourth device 10C-2. Wireless earbuds 10C-1 may autonomously and intelligently switch its active connection between second device 10B and fourth device 10C-2 based on which device is attempting to convey wireless data with the wireless earbuds and/or in response to a user input provided to second device 10B and/or fourth device 10C-2. However, this requires wireless earbuds 10C-1 to persistently perform radio scans and/or advertisement broadcasts for the connected device having the inactive link with the wireless earbuds.

At the first time illustrated by portion 122 of FIG. 9, wireless earbuds 10C-1 have a first communications link 123 with second device 10B that is active and has a second communications link with fourth device 10C-2 that is inactive. Wireless earbuds 10C-1 convey wireless data with second device 10B over communications link 123. At the same time, wireless earbuds 10C-1 continue to perform radio scans for advertisement signals 121 broadcast by fourth device 10C-2 and/or continue to broadcast advertisement signals to search for fourth device 10C-2 (e.g., to ensure a seamless transition to an active link between wireless earbuds 10C-1 and fourth device 10C-2 when needed). These radio scans and advertisement broadcasts can cause the radio on wireless earbuds 10C-1 to consume an excessive amount of power. At the first time, fourth device 10C-2 is in range of wireless earbuds 10C-1. As such, there is a substantial possibility that the user will want to switch the wireless earbuds to instead have an active link with fourth device 10C-2.

However, when fourth device 10C-2 is out of range of wireless earbuds 10C-1, there is low or no possibility that the user will switch the wireless earbuds to have an active link with fourth device 10C-2 instead of with second device 10B. In these situations, the persistent radio scans and advertisement broadcasts by the radio 60 on wireless earbuds 10C-1 represent wasted power that limits the battery life of the wireless earbuds. Portion 124 of FIG. 9 represents communications system 2 at a second time after the first time. At the second time, fourth device 10C-2 has moved to a location out of range of wireless earbuds 10C-1.

The camera data captured by first device 10A may be used to detect whether fourth device 10C-2 is in range of wireless earbuds 10C-1. For example, at the first time, fourth device 10C-2 may overlap the FOV 92 of first device 10A at least once within a predetermined time period (e.g., a time period during which the wearer of first device 10A is sufficiently likely to view all locations in its vicinity where fourth device 10C-2 could be located within range of wireless earbuds 10C-1). However, by the second time, fourth device 10C-2 has moved away from the FOV 92 of first device 10A. The camera data captured by first device 10A may therefore indicate that, at the second time, fourth device 10C-2 is not located within range of wireless earbuds 10C-1.

In response to detecting that fourth device 10C-2 is not within range of wireless earbuds 10C-1, first device 10A may transmit a control signal 126 to wireless earbuds 10C-1 (e.g., directly or via second device 10B, communication link 3, and communications link 123). Control signal 126 may instruct the radio 60 on wireless earbuds 10C-1 to stop performing radio scans and to stop broadcasting advertisement signals for fourth device 10C-2. Control signal 126 may instruct the radio 60 on wireless earbuds 10C-1 to stop or halt any current radio scan or advertisement broadcast and may instruct wireless earbuds 10C-1 to freeze, forego, or omit otherwise scheduled radio scans or advertisement broadcasts for fourth device 10C-2 (e.g., until instructed otherwise by first device 10A and/or second device 10B). This allows wireless earbuds 10C-1 to conserve power when fourth device 10C-2 is out of range of wireless earbuds 10C-1. Once first device 10A captures camera data indicative of fourth device 10C-2 moving back into range of wireless earbuds 10C-1, first device 10A may transmit a control signal 126 to wireless earbuds 10C-1 to instruct wireless earbuds 10C-1 to resume radio scans and advertisement broadcasts for fourth device 10C-2.

Figure 10:
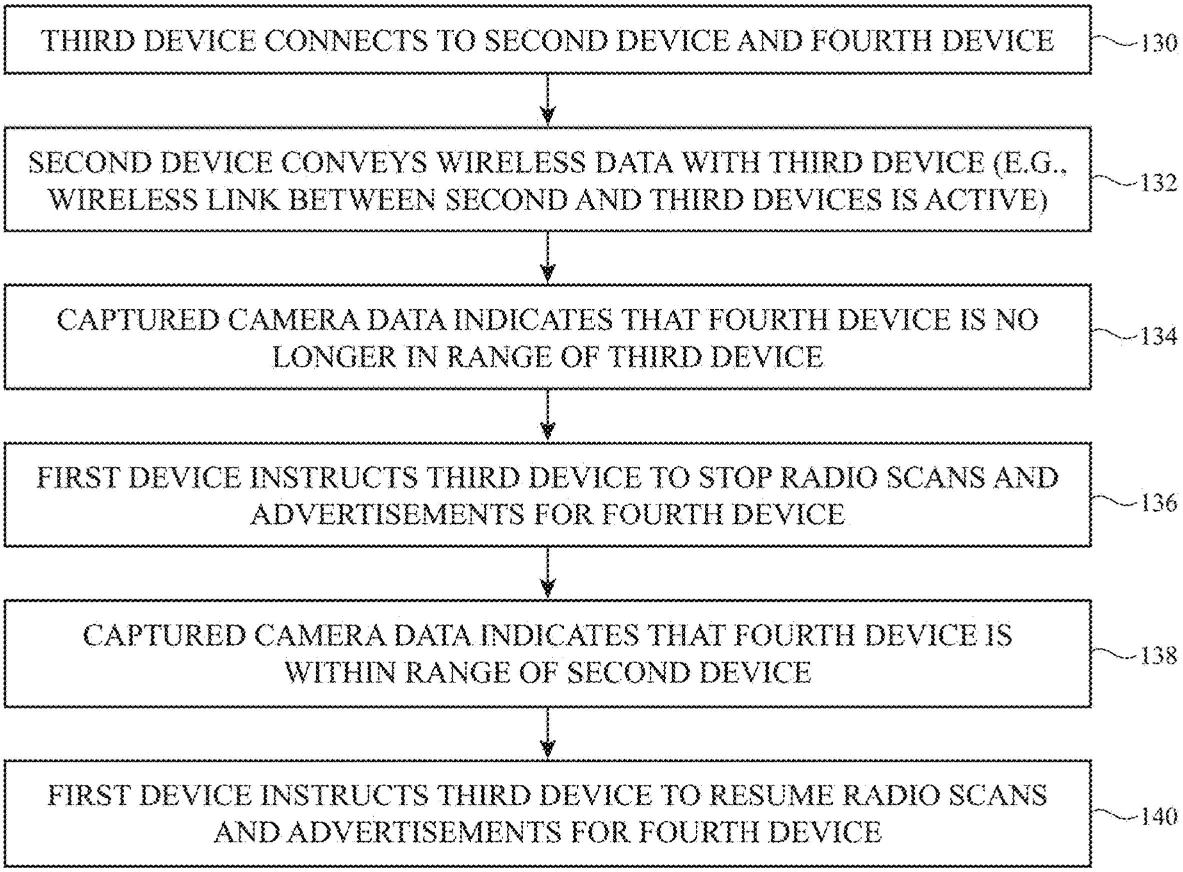
FIG. 10 is a flow chart of illustrative operations involved in using a head-mounted deice to trigger a radio in wireless earbuds to stop scanning for another device in accordance with some embodiments.

FIG. 10 is a flow chart of operations involved in using camera data captured by first device 10A to adjust the radio 60 on wireless earbuds 10C-1. Operations 134-140 of FIG. 10 may be performed while processing operation 82 of FIG. 6, for example.

At operation 130, wireless earbuds 10C-1 connect to second device 10B and, at a different time, connects to fourth device 10C-2. This establishes communications link 123 between second device 10B and wireless earbuds 10C-1 and establishes an additional communications link between second device 10B and fourth device 10C-2.

At operation 132, communications link 123 is active between second device 10B and wireless earbuds 10C-1. Second device 10B and wireless earbuds 10C-1 may convey wireless data over communications link 123. Wireless earbuds 10C-1 remain connected to fourth device 10C-2 but the communications link between wireless earbuds 10C-1 and fourth device 10C-2 is inactive.

At operation 134, first device 10A may capture camera data indicative of fourth device 10C-2 being out of range of wireless earbuds 10C-1 (e.g., as shown by portion 124 of FIG. 9). For example, fourth device 10C-2 may be absent from the captured camera data for at least a predetermined time period.

At operation 136 (e.g., responsive to detecting or estimating that fourth device 10C-2 is out of range of wireless earbuds 10C-1), first device 10A may transmit a control signal 126 to wireless earbuds 10C-1 that instructs the radio 60 on wireless earbuds 10C-1 to stop performing radio scans and advertisement broadcasts for fourth device 10C-2 (e.g., until instructed otherwise by second device 10B or first device 10A). This may stop or halt any current radio scan or advertisement broadcast for fourth device 10C-2 and may cause wireless earbuds 10C-1 to forego any future radio scan or advertisement broadcast for fourth device 10C-2 until further control signals or an additional trigger are received. This may serve to minimize power consumption at wireless earbuds 10C-1 with minimal risk to user experience, since fourth device 10C-2 is unlikely to be connectable to wireless earbuds 10C-1 when it is not present in the camera data captured by first device 10A.

At operation 138, first device 10A may capture camera data indicative of fourth device 10C-2 being within or moving back to within range of wireless earbuds 10C-1 (e.g., as shown by portion 122 of FIG. 9). For example, fourth device 10C-2 may be detected in the captured camera data.

At operation 140 (e.g., responsive to detecting that fourth device 10C-2 is within or has moved back to within range of wireless earbuds 10C-1), first device 10A may transmit a control signal 126 to wireless earbuds 10C-1 that instructs the radio 60 on wireless earbuds 10C-1 to start or resume performing radio scans and advertisement broadcasts for fourth device 10C-2. This may allow wireless earbuds 10C-1 to switch its active communications link from second device 10B to fourth device 10C-2 when needed without detriment to user experience.

Alternatively, second device 10B may be omitted, communications link 123 may be between wireless earbuds 10C-1 and first device 10A rather than between second device 10B and wireless earbuds 10C-1, wireless earbuds 10C-1 may connect to first device 10A instead of second device 10B at operation 130, and first device 10A may convey wireless data with wireless earbuds 10C-1 at operation 132.

Figure 11:
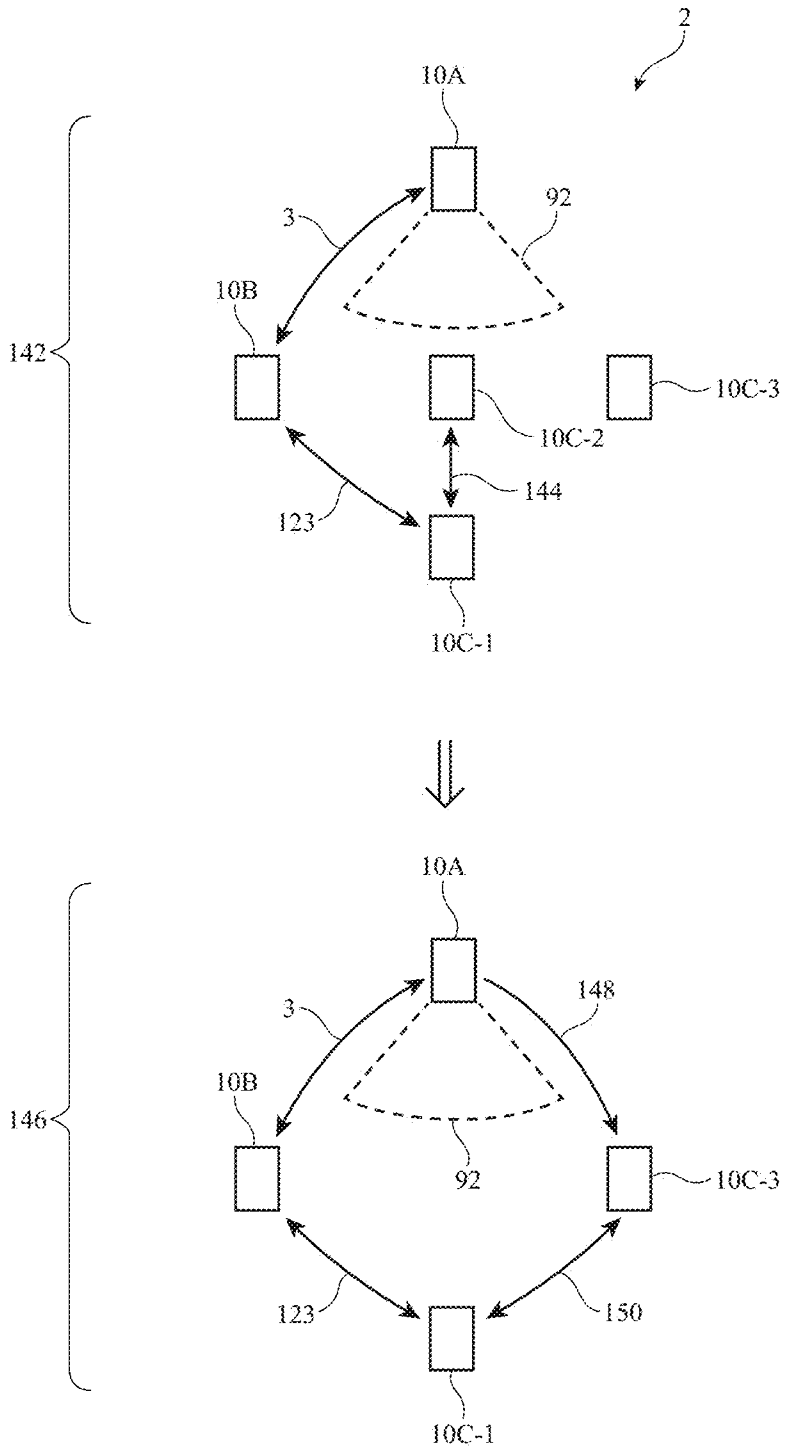
FIG. 11 is a diagram showing how an illustrative head-mounted device may trigger a radio in wireless earbuds to connect to another device after an already-connected device moves away from the wireless earbuds in accordance with some embodiments.

FIG. 11 illustrates another example in which a fifth device 10C-3 attempts to connect to wireless earbuds 10C-1 after the wireless earbuds have already connected to both second device 10B and fourth device 10C-2. Portion 142 illustrates a first time in which wireless earbuds 10C-1 concurrently maintains a first communications link 123 with second device 10B and a second communications link 144 with fourth device 10C-2. The user may have a fifth device 10C-3 (from set 4 of FIG. 1) that is within range of wireless earbuds 10C-1. Wireless earbuds 10C-1 may seamlessly switch its active link between communications link 123 and communications link 144 as needed. However, the radio 60 on wireless earbuds 10C-1 does not support more than two concurrent communications links under its associated protocol. To connect wireless earbuds 10C-1 to fifth device 10C-3 instead of fourth device 10C-2, the user may need to manually configure fourth device 10C-2 and/or fifth device 10C-3 to replace the connection between wireless earbuds 10C-1 and fourth device 10C-2 with a connection between wireless earbuds 10C-1 and fifth device 10C-3.

Rather than requiring a manual configuration, the system may leverage camera data gathered by first device 10A to facilitate the switch of wireless earbuds 10C-1 from maintaining a communications link with fourth device 10C-2 to instead maintaining a communications link with fifth device 10C-3. At the first time, first device 10A may capture camera data indicative of fourth device 10C-2 and fifth device 10C-3 both being present within range of wireless earbuds 10C-1. Portion 146 of FIG. 11 illustrates a second time at which fourth device 10C-2 has moved out of range of wireless earbuds 10C-1. At this time, first device 10A may capture camera data indicative of fifth device 10C-3 being within range of wireless earbuds 10C-1 and indicative of fourth device 10C-2 being out of range of wireless earbuds 10C-1.

In response to the camera data being indicative of fourth device 10C-2 being out of range of wireless earbuds 10C-1 and fifth device 10C-3 being within range of wireless earbuds 10C-1, first device 10A may transmit a control signal 148 to fifth device 10C-3 (e.g., directly or via second device 10B). Control signal 148 may instruct the radio 60 on fifth device 10C-3 to initiate and establish a communications link 150 between wireless earbuds 10C-1 and fifth device 10C-3. Control signal 148 may, for example, instruct the radio 60 on fifth device 10C-3 to begin performing radio scans and broadcasting advertisement signals for wireless earbuds 10C-1. Once wireless earbuds 10C-1 have discovered fifth device 10C-3 and/or fifth device 10C-3 has discovered wireless earbuds 10C-1, fifth device 10C-3 may be connected to wireless earbuds 10C-1 over communications link 150. Wireless earbuds 10C-1 may seamlessly switch its active link between communications link 123 and communications link 150 as needed.

Figure 12:
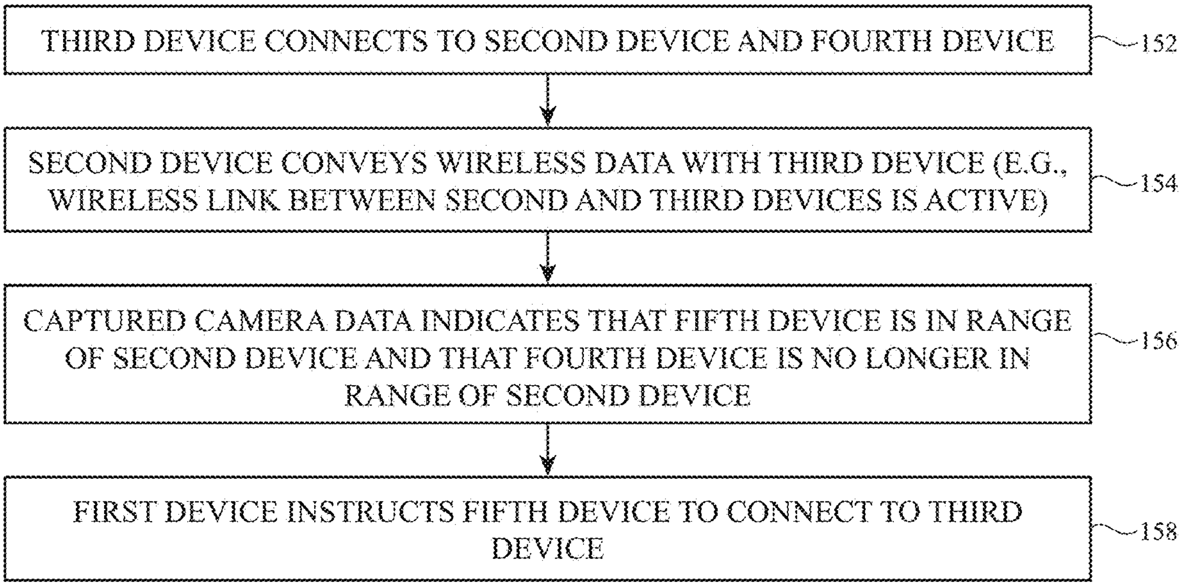
FIG. 12 is a flow chart of illustrative operations involved in using a head-mounted device to trigger a radio in wireless earbuds to connect to another device after an already-connected device moves away from the wireless earbuds in accordance with some embodiments.

FIG. 12 is a flow chart of operations involved in using camera data captured by first device 10A to adjust the radio 60 on wireless earbuds 10C-1 to replace communications link 144 with communications link 150. The operations of FIG. 12 may be performed while processing operation 82 of FIG. 6, for example.

At operation 152, wireless earbuds 10C-1 connect to second device 10B and, at a different time, connect to fourth device 10C-2. This establishes communications link 123 between second device 10B and wireless earbuds 10C-1 and communications link 144 between wireless earbuds 10C-1 and fourth device 10C-2.

At operation 154, communications link 123 is active between second device 10B and wireless earbuds 10C-1. Second device 10B and wireless earbuds 10C-1 may convey wireless data over communications link 123. Wireless earbuds 10C-1 remain connected to fourth device 10C-2 but the communications link between wireless earbuds 10C-1 and fourth device 10C-2 is inactive. Wireless earbuds 10C-1 continue to perform radio scans and advertisement broadcasts for fourth device 10C-2 (e.g., to support the inactive communications link 144).

At operation 156, first device 10A may capture camera data indicative of fourth device 10C-2 being out of range of wireless earbuds 10C-1 and indicative of fifth device 10C-3 being within range of wireless earbuds 10C-1 (e.g., as shown by portion 146 of FIG. 11).

At operation 158 (e.g., responsive to detecting that fourth device 10C-2 is out of range of wireless earbuds 10C-1 and that fifth device 10C-3 is within range of wireless earbuds 10C-1), first device 10A may transmit a control signal 148 to fifth device 10C-3 that instructs the radio 60 on fifth device 10C-3 to establish communications link 150 with wireless earbuds 10C-1. This may begin or initiate radio scans and/or advertisement broadcasts at the radio on fifth device 10C-3 for wireless earbuds 10C-1. Wireless earbuds 10C-1 may discover fifth device 10C-3 based on the radio scans and advertisement broadcasts, connecting wireless earbuds 10C-1 to fifth device 10C-3 over communications link 150. Wireless earbuds 10C-1 may then seamlessly switch between conveying wireless data with second device 10B over communications link 123 and conveying wireless data with fifth device 10C-3 over communications link 150 as needed. In this way, first device 10A may reconfigure the second communications link maintained by wireless earbuds 10C-1 without requiring the user to manually configure fifth device 10C-3 to connect to wireless earbuds 10C-1 when fourth device 10C-2 is out of range of wireless earbuds 10C-1. If desired, this process may be reversed when fourth device 10C-2 moves back into range of wireless earbuds 10C-1.

Alternatively, second device 10B may be omitted, communications link 123 may be between wireless earbuds 10C-1 and first device 10A rather than between second device 10B and wireless earbuds 10C-1, wireless earbuds 10C-1 may connect to first device 10A instead of second device 10B at operation 130, and first device 10A may convey wireless data with wireless earbuds 10C-1 at operation 132.

Figure 13:
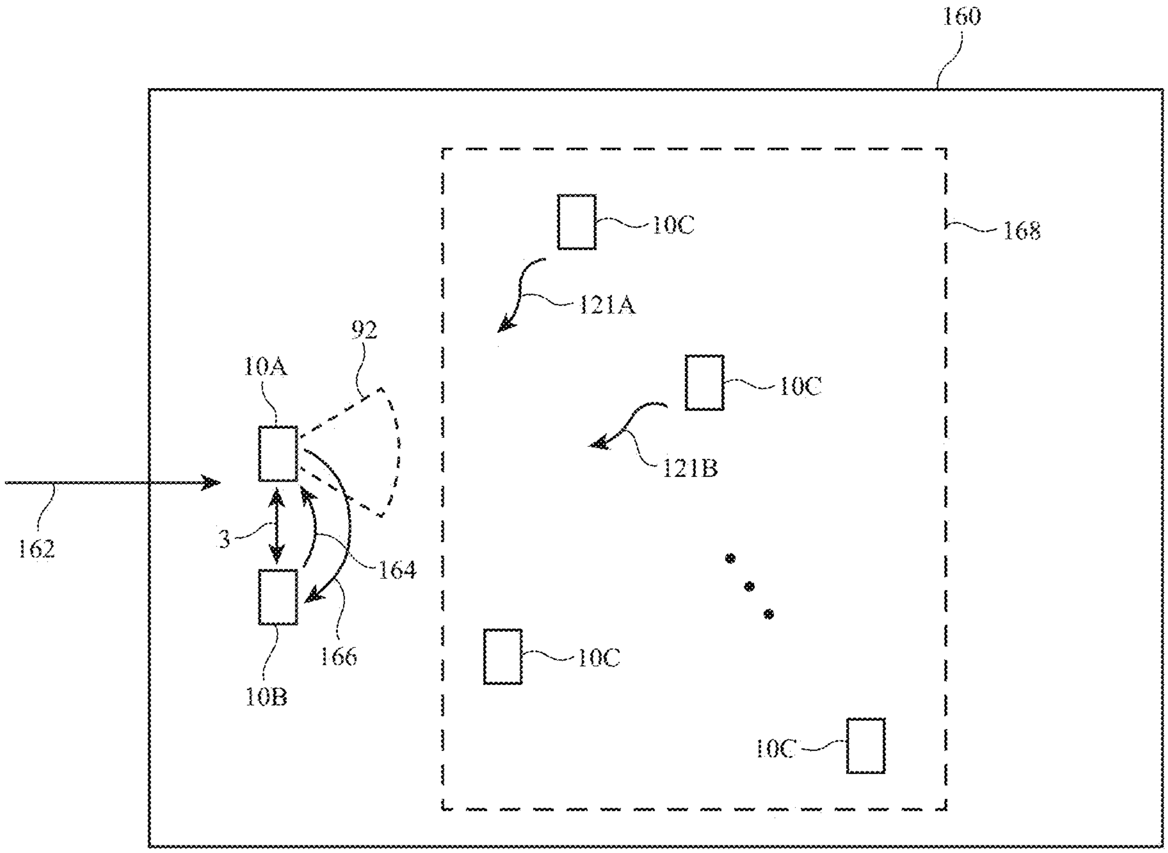
FIG. 13 is a diagram showing how an illustrative head-mounted device may trigger a radio to scan for a set of devices associated with a predetermined location in accordance with some embodiments.

If desired, first device 10A may help to trigger radio scans and/or advertisement broadcasts by second device 10B in response to the wearer of first device 10A moving to a predetermined location. FIG. 13 is a diagram showing on example of how first device 10A may operate to trigger radio scans and/or advertisement broadcasts by second device 10B in response to the wearer of first device 10A moving to or arriving at a predetermined location.

In the example of FIG. 13, the wearer of first device 10A moves into or arrives at a predetermined location 160 (as shown by arrow 162). Predetermined location 160 may include a particular geographic location or area (e.g., a building, a park, a city, a campus, an airport, an office, a room, etc.). Predetermined location 160 may be associated with the user of set 4 (FIG. 1). Predetermined location 160 may be, for example, a home or workplace of the user. The set 4 of devices 10 associated with the user may include a subset 168 of devices 10C that are located at predetermined location 160. The user may, for example, provide a user input to one or more of the devices that tie, register, or associate the devices to a user. The user may also provide a user input and/or sensor data on the devices 10C in subset 168 may tie, register, or associate the devices 10C in subset 168 to predetermined location 160. Device database 49 (FIG. 4) and/or database 9 (FIG. 1) may store information identifying the devices 10C in subset 168 as well as the corresponding predetermined location 160.

Once the wearer of device 10A has arrived at predetermined location 160, it may be desirable for second device 10B to seamlessly connect its radio(s) 60 to the devices 10C in subset 168. Camera data captured by first device 10A may help to confirm the arrival of second device 10B at predetermined location 160 to prevent unnecessary radio scans and advertisement signal broadcasts by second device 10B, which may maximize battery life at second device 10B.

For example, second device 10B may first estimate that it has arrived at predetermined location 160. Second device 10B may estimate its location using a satellite navigation receiver and/or other sensors. In response to estimating that second device 10B has arrived at predetermined location 160, second device 10B may transmit an allow list 164 to first device 10A. Allow list 164 may identify some or all of the devices 10C in subset 168 that second device 10B wants to scan for upon arriving at predetermined location 160.

First device 10A may then process its camera data to help confirm that first device 10A and second device 10B have arrived at predetermined location 160. For example, first device 10A may process the captured camera data to determine whether one or more features associated with predetermined location 160 and/or to determine whether one or more of the devices 10C identified by allow list 164 are present within the FOV 92 of first device 10A. In response to determining that the one or more features associated with predetermined location 160 and/or that one or more of the devices 10C identified by allow list 164 are present within the FOV 92 of first device 10A, first device 10A may transmit confirmation signal 166 to second device 10B. Confirmation signal 166 may include data (e.g., one or more bits) confirming that first device 10A has detected that devices 10A and 10B are at predetermined location 160 and/or may include information identifying which of the devices 10C from allow list 164 were present in the captured camera data.

In response to receiving confirmation signal 166, second device 10B may begin to connect to each of the devices 10C in allow list 164 and/or subset 168. Second device 10B may connect to all of the devices 10C in allow list 164 and/or subset 168 or may connect only to the devices 10C that were included in the camera data captured by first device 10A. Second device 10B may connect to devices 10C in subset 168 by performing radio scans and broadcasting advertisement signals using each of the different RATs implemented by devices 10C. For example, subset 168 may include at least one device 10C that communicates using a first RAT and that transmits advertisement signals 121A using the first RAT (e.g., Bluetooth) and may include at least one device 10C that communicates using a second RAT (e.g., WLAN) and that transmits advertisement signals 121B using the second RAT. Second device 10B may independently perform a radio scan for advertisement signals 121A using a first radio 60 that implements the first RAT and a radio scan for advertisement signals 121B using a second radio 60 that implements the second RAT. Similarly, second device 10B may independently broadcast advertisement signals using the first radio and the first RAT and using the second radio and the second RAT. This may be generalized to any desired number of RATs.

In this way, second device 10B may autonomously connect to each of the devices 10C in subset 168 using the appropriate scan and advertisement procedures regardless of how many RATs are implemented across devices 10C and without requiring any manual configuration by the user, which may optimize user experience. By leveraging the camera data captured by first device 10A, second device 10B may be certain of its arrival to predetermined location 160 prior to beginning the radio scans and advertisement broadcasts, which may minimize power consumption on second device 10B.

Figure 14:
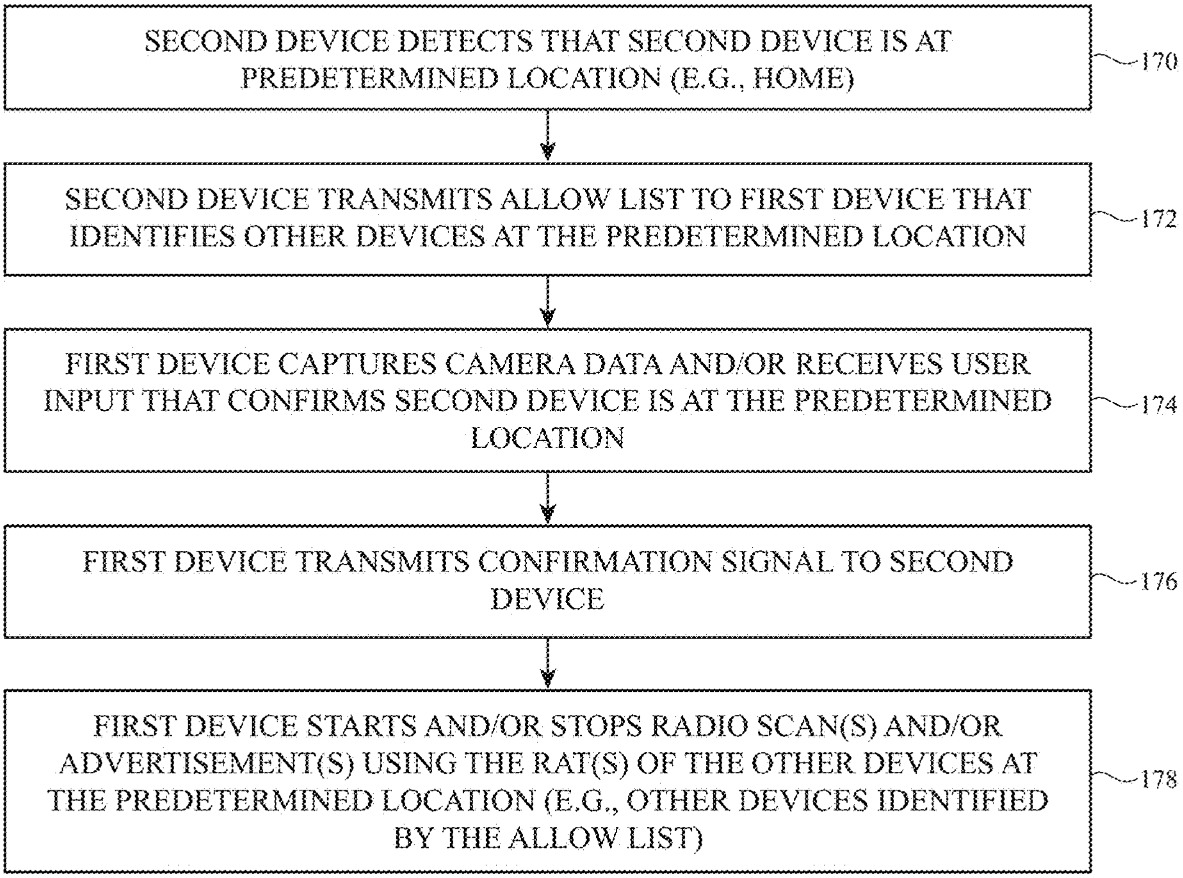
FIG. 14 is a flow chart of illustrative operations involved in using a head-mounted device to trigger a radio to scan for a set of devices associated with a predetermined location in accordance with some embodiments.

FIG. 14 is a flow chart involved in connecting second device 10B to the subset 168 of devices 10C at predetermined location 160 upon arrival of second device 10B at predetermined location 160. The operations of FIG. 14 may be performed while processing operation 82 of FIG. 6, for example.

At operation 170, second device 10B may detect, identify, or estimate that it has arrived at predetermined location 160 (e.g., using a satellite navigation receiver and/or other sensors). The predetermined location may be, for example, a home location for the user. The user may have a subset 168 of devices 10C that are located at the predetermined location (e.g., at the user's home).

At operation 172 (e.g., responsive to detecting, identifying, or estimating that second device 10B has arrived at predetermined location 160), second device 10B may transmit allow list 164 to first device 10A. Second device 10B may, for example store allow list 164 on its device database 49 (FIG. 4). Second device 10B may transmit allow list 164 to first device 10A over communications link 3.

At operation 174, first device 10A may capture camera data indicative of first device 10A being at predetermined location 160. For example, the OFC data captured by first device 10A may include one or more features associated with predetermined location 160 and/or may include one or more of the devices 10C identified by the allow list 164 received from second device 10B. Additionally or alternatively, first device 10A may receive a user input indicating or confirming that first device 10 has arrived at predetermined location 160 (e.g., in response to a graphical prompt on first device 10A for the user to confirm that the user has arrived at predetermined location 160).

At operation 176 (e.g., responsive to capturing camera data that includes the feature(s) associated with predetermined location 160, responsive to capturing camera data that includes at least one of the devices 10C identified by the allow list 164, and/or responsive to a corresponding user input at first device 10A), first device 10A may transmit confirmation signal 166 to second device 10B (e.g., over communications link 3).

At operation 178 (e.g., responsive to the receipt of confirmation signal 166), second device 10B may begin to connect to each of the devices 10C in allow list 164 and/or in subset 168 (e.g., the group of devices 10C at predetermined location 160). This may involve second device 10B starting and/or stopping radio scans and/or advertisement broadcasts using the RAT(s) of the devices 10C in allow list 164 and/or subset 168.

If desired, when second device 10B and/or the camera data captured by device 10A indicates that the devices have moved away from predetermined location 160 (e.g., are no longer at predetermined location 160), second device 10B may use communications link 3 to instruct second device 10B to stop, halt, and/or freeze radio scans and/or advertisement broadcasts for the devices 10C in subset 168 until second device 10B returns to predetermined location 160. This may serve to conserve power and maximize battery life on second device 10B.

Alternatively, second device 10B may be omitted and first device 10A may connect to the devices 10C in subset 168 in response to capturing camera data that includes one or more of the features of predetermined location 160, in response to capturing camera data that includes one or more of the devices 10C in subset 168, in response to a corresponding user input, and/or in response to a satellite navigation receiver on first device 10A estimating that first device 10A is at predetermined location 160.

Figure 15:
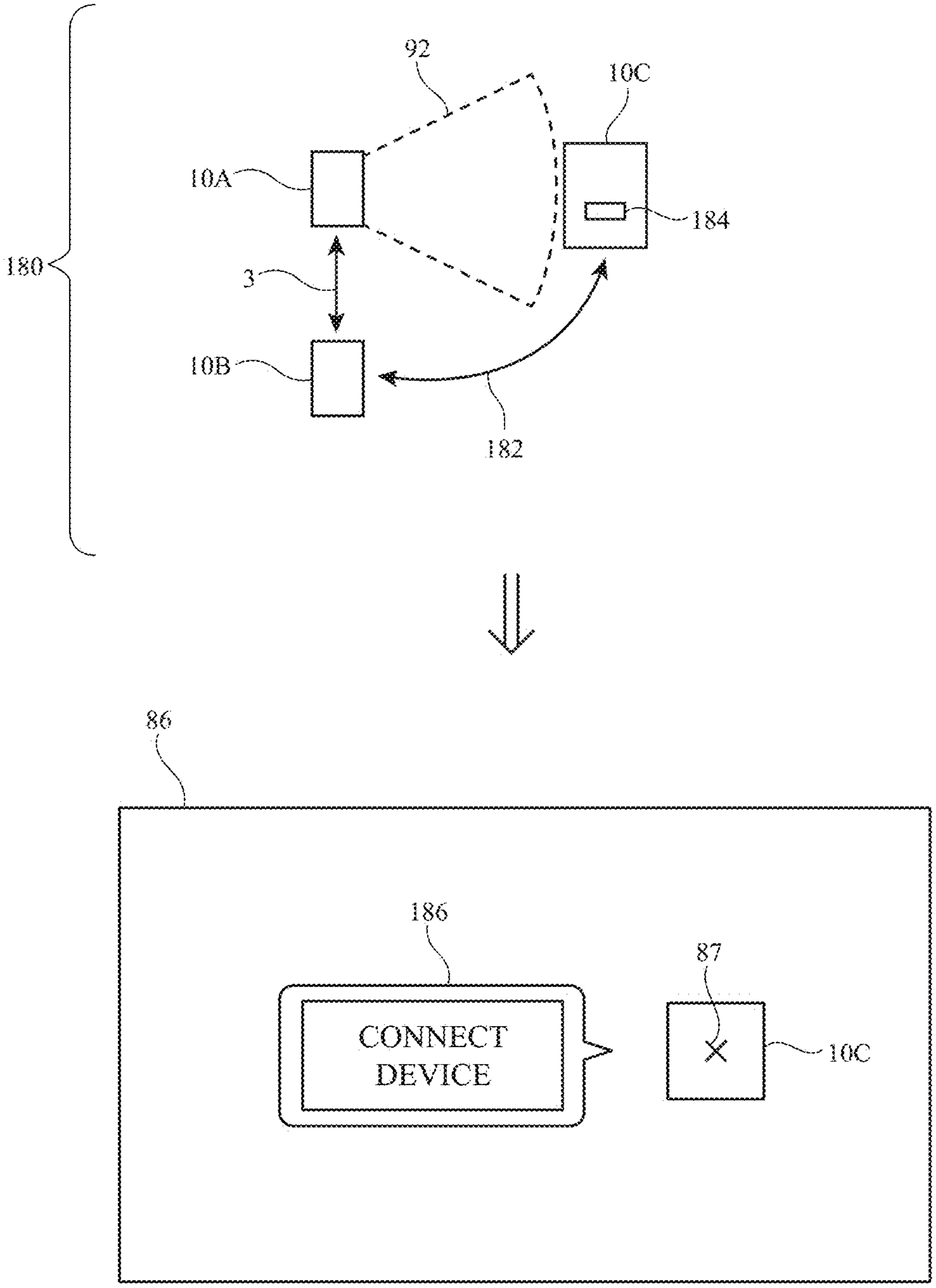
FIG. 15 is a diagram showing how an illustrative head-mounted device may detect one or more features of another device to trigger a radio to scan for the device in accordance with some embodiments.

If desired, first device 10A may detect one or more features of a third device 10C that has not previously been registered to the user or connected to one of the devices 10 of set 4 to trigger a radio scan for third device 10C. As one example, third device 10C may be a device that was recently purchased by the user but that has not yet been set up or configured. FIG. 15 is a diagram showing an example in which first device 10A detects one or more features of such a third device 10C to trigger a radio scan for third device 10C at second device 10B.

As shown in portion 180 of FIG. 15, third device 10C may be brought into the vicinity of first device 10A and second device 10B. Third device 10C may have one or more features 184 that uniquely and/or generically identify third device 10C. Features 184 may be features on the housing of third device 10C, images displayed on a display of third device 10C, and/or features on the packaging of third device 10C (e.g., prior to removal or unboxing of third device 10C from its packaging after purchase by the user) such as a bar code or QR code.

While wearing first device 10A, the user may place third device 10C into the FOV 92 of first device 10A. The user may focus on third device 10C while in FOV 92 (e.g., by gazing at third device 10C for more than a predetermined time period). First device 10A may generate camera data. The camera data may include OFC data and IFC data that indicates that the user is gazing or focusing on third device 10C. The OFC data may also include images of the feature(s) 184 on third device 10C).

Responsive to detecting that the user is gazing or focusing on third device 10C (e.g., with a gaze direction 87 overlapping third device 10C for more than a predetermined amount of time), first device 10A may transmit a signal to second device 10B identifying feature(s) 184 on third device 10C (e.g., some or all of the OFC data). Second device 10B may then search an external database (e.g., database 9 of FIG. 1) to retrieve information that identifies third device 10C based on the feature(s) 184 captured by first device 10A. The information retrieved from the external database may identify the RAT and/or other wireless capabilities of the identified third device 10C (e.g., may identify that third device 10C has a radio that communicates using Bluetooth, may identify that third device 10C has a radio that communicates using WLAN, may identify that third device 10C is a pair of wireless earbuds, etc.). Alternatively, first device 10A may search the external database itself (e.g., using radio-frequency signals 7 of FIG. 1) without first communicating with second device 10B and may then inform second device 10B about the identity of third device 10C via communications link 3.

Once second device 10B is aware of the identity of third device 10C, second device 10B may then attempt to connect to third device 10C using the corresponding RAT identified from the external database. For example, second device 10B may connect to third device 10C by performing radio scans and broadcasting advertisement signals using the identified RAT associated with third device 10C. Second device 10B may continue to perform radio scans and advertisement broadcasts for a predetermined time period associated with the amount of time required for a user to unbox, power on, and configure a newly purchased third device 10C (e.g., 1 minute, 5 minutes, 1-10 minutes, 1-30 minutes, etc.). Alternatively, second device 10B may continue to perform radio scans and broadcast advertisement signals as long as the wearer of first device 10A keeps their gaze direction 87 on third device 10C and/or as long as the wearer of first device 10A keeps third device 10C within FOV 92. In this example, first device 10A may transmit a signal instructing second device 10B to halt, stop, end, or freeze radio scans and advertisement signal broadcasts for third device 10C in response to detecting that third device 10A has moved away from FOV 92 and/or gaze direction 87. This may help to minimize unnecessary radio scanning and advertisement broadcasting at second device 10B (which may minimize power consumption) while also minimizing the amount of manual interaction required by the user to connect second device 10B to the previously-unconnected third device 10C. Once second device 10B has discovered and connected to third device 10C, second device 10B may convey wireless data with third device 10C using a corresponding communications link 182 between second device 10B and third device 10C.

If desired, prior to, concurrent with, or after second device 10B performing radio scans and advertisement broadcasting for third device 10C, first device 10A may display a GUI element such as a connection confirmation 186 in the image 86 displayed by display 14 (FIG. 2). Connection confirmation 186 may prompt a user input to confirm that the user intends to connect second device 10B to first device 10C. First device 10A may receive a user input indicative of the user selecting connection confirmation 186 (e.g., a gaze direction overlapping connection confirmation 186 plus a corresponding gesture of hand 18). First device 10A may convey wireless data with third device 10C after the user has selected connection confirmation 186 in this example.

Figure 16:
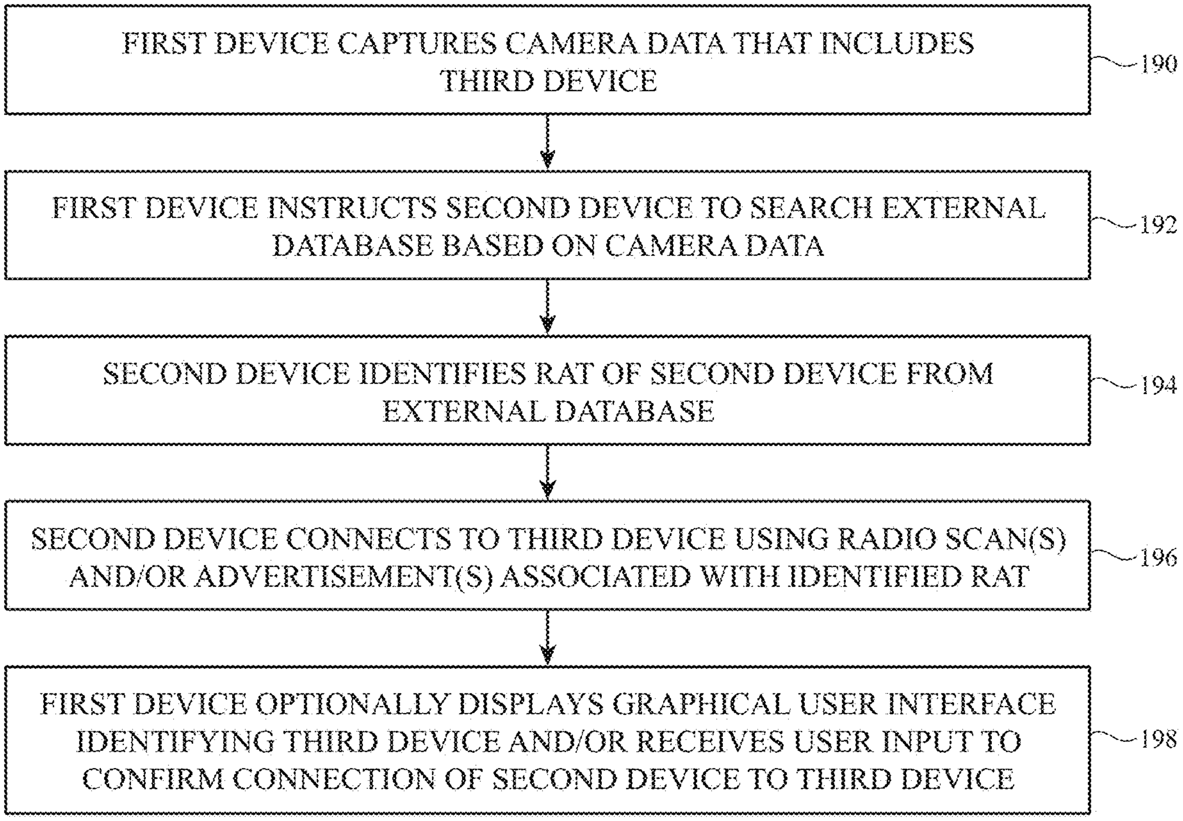
FIG. 16 is a flow chart of illustrative operations involved in using a head-mounted device to detect one or more features of another device to trigger a radio to scan for the device in accordance with some embodiments.

FIG. 16 is a flow chart of operations involved in using first device 10A to detect one or more features of third device 10C to trigger a radio scan for third device 10C at second device 10B. Operations 190-196 may be performed while processing operation 82 of FIG. 6, for example. Operation 198 may be performed while processing operation 84 of FIG. 6, for example.

At operation 190, first device 10A may capture camera data that indicates that the wearer of device 10A is focusing their eyes on third device 10C. This may include OFC data that includes feature(s) 184 on third device 10C and/or IFC data indicating that the wearer's gaze direction 87 overlaps third device 10C for at least a predetermined time period.

At operation 192, first device 10A may use communications link 3 to instruct second device 10B to search the external database (e.g., database 9 of FIG. 1) for information identifying third device 10C based on the feature(s) 184 in the captured camera data. This may include, for example, transmitting a signal to second device 10B over communications link 3 that includes or identifies feature(s) 184 and/or other information associated with the identity or type of device of third device 10C.

At operation 194, second device 10B may identify (e.g., receive, retrieve, gather, query, etc.), from the external database, third device 10C as well as the RAT and/or other wireless capabilities of third device 10C.

At operation 196, second device 10B may attempt to connect to (e.g., search for) third device 10C based on the information received from the external database. In this way, the signal transmitted by first device 10A at operation 192 may assist the radio 60 on second device 10B to search for third device 10C. For example, second device 10B may start performing radio scans and/or advertisement broadcasts using the RAT(s) of the device 10C as identified by the external database. Second device 10B may continue to perform radio scans and/or advertisement broadcasts for a predetermined time period, until the user's gaze direction moves away from third device 10C (e.g., as identified by the camera data captured by first device 10A), and/or until third device 10C leaves the FOV 92 of first device 10A (e.g., as identified by the camera data captured by first device 10A). Once second device 10B has successfully discovered and connected to third device 10C, a communications link 182 is established between second device 10B and third device 10C.

At operation 198, first device 10A may optionally display connection confirmation 186 and/or may receive a user input indicative of the wearer intending to connect second device 10B to third device 10C. Responsive to second device 10B successfully connecting to third device 10C, second device 10B may convey wireless data with third device 10C over communications link 182.

Alternatively, second device 10B may be omitted and first device 10A may connect to third device 10C in response to capturing camera data that includes feature(s) 184 of third device 10C. In these examples, first device 10A may search the external database at operation 192, may identify the RAT of third device 10C at operation 194, and may connect to third device 10A at operation 196.

One or more of the devices 10 in set 4 such as second device 10B may be operable in a power-saving mode (sometimes also referred to herein as a low-power mode). In the power-saving mode, one or more device functions, processes, features, and/or operations may be slowed, disabled, throttled, reduced, or otherwise adjusted to reduce power consumption on the device and to preserve battery life. In some implementations, second device 10B continues to perform radio scans and advertisement signal broadcasts while in the power-saving mode to ensure that second device 10B remains able to seamlessly connect to previously-connected devices as needed. If desired, first device 10A may help to further reduce power consumption at second device 10B when second device 10B is in the power-saving mode.

Figure 17:
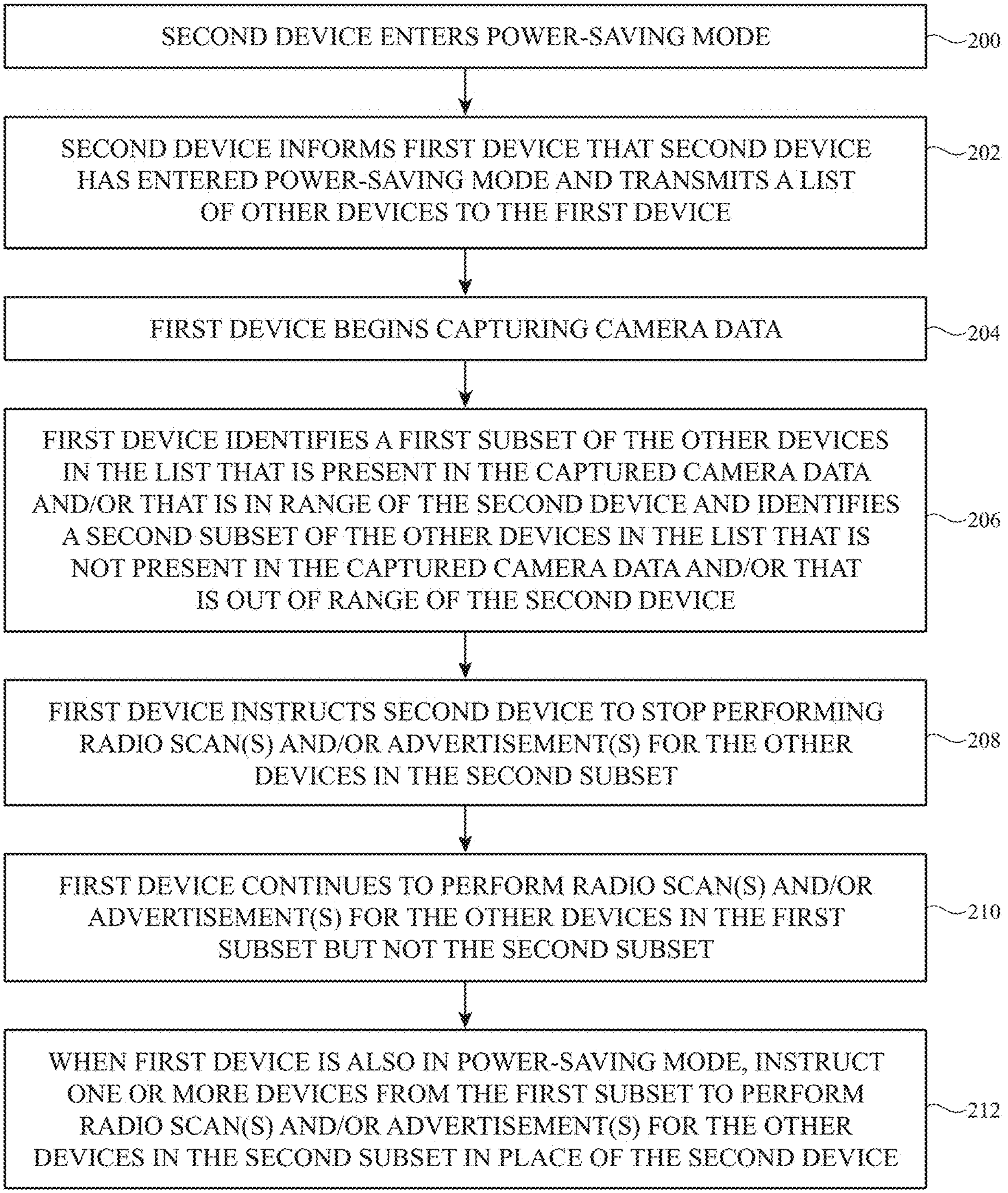
FIG. 17 is a flow chart of illustrative operations involved in using a head-mounted device to reduce power consumption associated with performing radio scans at a second device when the second device and optionally the head-mounted device are in a power-saving mode in accordance with some embodiments.

FIG. 17 is a flow chart of operations involved in using first device 10A to reduce power consumption at second device 10B when second device 10B is in the power-saving mode. Operations 200-212 of FIG. 17 may, for example, be performed while processing operation 82 of FIG. 6.

At operation 200, second device 10B enters the power-saving mode. Second device 10B may enter the power-saving mode automatically upon the device having a battery level that falls below a threshold level and/or in response to receipt of a user input instructing second device 10B to enter the power-saving mode.

At operation 202, second device 10B may use communications link 3 to inform first device 10A that second device 10B has entered the power-saving mode. If desired, second device 10B may also use communications link 3 to transmit a list of other devices in set 4 (e.g., devices 10C of FIG. 1) for first device 10A to monitor for while second device 10B is in the power-saving mode. Second device 10B may persistently perform radio scans and/or may broadcast advertising signals for the devices in the list of other devices (e.g., to allow for quick and seamless connection to the devices when needed).

At operation 204, first device 10A may begin to capture camera data and may begin to process the captured camera data to determine (e.g., detect, identify, estimate, etc.) whether any of the other devices in the list of other devices is present in range of second device 10B.

At operation 206, first device 10A may identify, based on the captured camera data, a first subset of the other devices from the list of other devices that are present in range of second device 10B. The devices in the first subset may, for example, be devices that are present in the OFC data generated by first device 10A over a predetermined time period (e.g., since devices that are optically visible from first device 10A are highly likely to be within radio range of second device 10B).

First device 10A may also identify, based on the captured camera data, a second subset of the other devices from the list of other devices that are not present within range of second device 10B (e.g., that are out of range or highly likely to be out of range of second device 10B). The devices in the second subset may, for example, be devices that are absent or not included in the OFC data generated by first device 10A over the predetermined time period (e.g., since devices that are not optically visible from first device 10A are highly unlikely to be within radio range of second device 10B).

At operation 208, first device 10A may use communications link 3 to instruct first device 10A to stop performing radio scan(s) and/or advertisement broadcasts for the second subset of other devices. First device 10A may, for example, transmit a signal to second device 10B that assists the radio on second device 10B to search for the second subset of other devices.

At operation 210 (e.g., responsive to receipt of the instruction from first device 10A), second device 10B may stop any current radio scan and/or advertisement broadcast and may forego beginning a new radio scan or advertisement broadcast for devices in the second subset until further instructions have been received from first device 10A. Since the devices in the second subset are not optically visible to first device 10A and are highly likely to be out of range of second device 10B, stopping radio scans and advertisement broadcasts for those devices may conserve power at the radios of second device 10B without risking disruption to the wireless performance of second device 10B.

At the same time, second device 10B may continue to perform radio scans and/or advertisement broadcasts for the devices in the first subset, since the devices in the first subset are optically visible to first device 10A and are highly likely to be within range of second device 10B. Second device 10B may connect to any of the devices in the first subset when found and may then convey wireless data with the connected devices from the first subset. In this way, first device 10A may help to further reduce power for second device 10B while in the power-saving mode without sacrificing wireless performance or the ability of second device 10B to quickly and seamlessly connect to the nearby devices when needed.

In some situations, first device 10A may also be in a power-saving mode. In these situations, processing may proceed to operation 212. At operation 212, first device 10A may transmit an instruction to the radio on one or more of the devices from the first subset (and/or any other devices 10 in set 4) to perform radio scans and/or advertisement broadcasts for one or more of the devices from the second subset instead of second device 10B. First device 10A may transmit the instruction directly (e.g., over communications links between first device 10A and the devices from the first subset) and/or via second device 10B. When one of the devices in the second subset discovers one of the devices in the second subset, that device may transmit information identifying the discovered device to second device 10B and/or first device 10A. In this way, some of the radio scan and advertisement broadcast overhead for second device 10B and first device 10A may be offloaded and distributed across other nearby devices 10 from set 4, helping to further reduce power consumption at first device 10A and second device 10B when both devices are in the power-saving mode. Alternatively, second device 10B may be omitted, first device 10A may perform radio scans and advertisement broadcasts for devices in the first subset, and first device 10A may forego radio scans and advertisement broadcasts for devices in the second subset.

Figure 18:
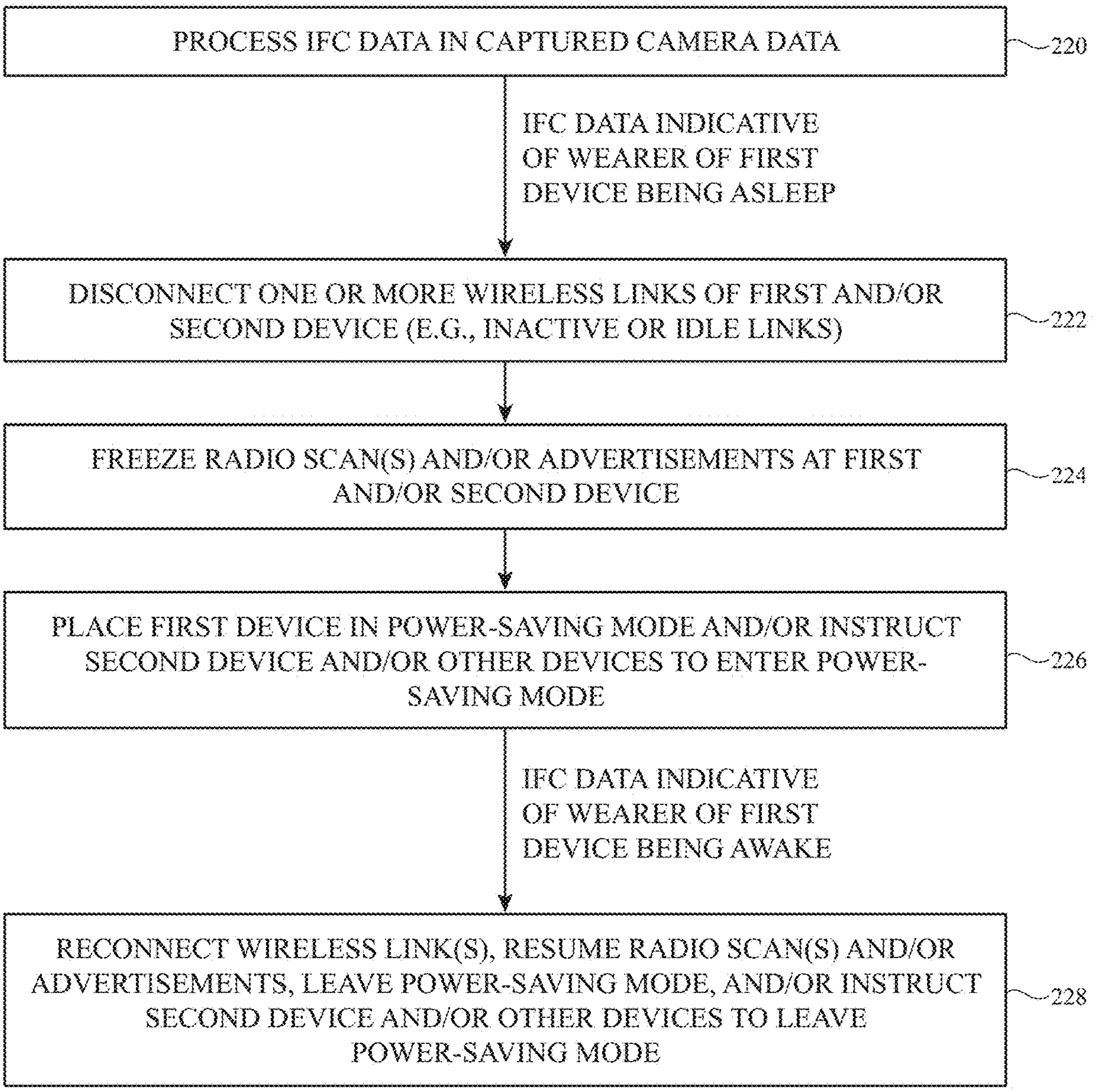
FIG. 18 is a flow chart of illustrative operations involved in using a head-mounted device to reduce power consumption in a communications system when the head-mounted device detects that its wearer is asleep in accordance with some embodiments.

If desired, first device 10A may detect whether its wearer is asleep and may help to reduce power consumption across the devices 10 in set 4 (FIG. 1) when the wearer is detected to be asleep. FIG. 18 is a flow chart of operations involved in using first device 10A to reduce power consumption when its wearer is asleep. Operations 220-228 of FIG. 18 may be performed while processing operation 82 of FIG. 6, for example.

At operation 220, first device 10A may process IFC data in its captured camera data. The IFC data may be indicative of whether the wearer's eyes at eye boxes 13 (FIG. 2) are open or closed at any given time. When or responsive to the IFC data being indicative of the wearer of first device 10A being asleep (e.g., when the IFC data identifies or estimates that the user's eyes have been closed for more than a predetermined time period such as 1-30 minutes, 30-60 seconds, 1-10 minutes, 5 minutes, etc.), processing proceeds to operation 222. Operations 222-226 may be performed in any desired order. If desired, two or more of operations 222-226 may be performed in parallel. One or more of operations 222-226 may be omitted if desired.

At operation 222 (e.g., responsive to first device 10A detecting that the wearer is asleep, responsive to the IFC data indicating that the wearer's eyes have been closed for longer than a predetermined time period, etc.), first device 10A may disconnect, end, terminate, or otherwise disable one or more inactive or idle communications links between first device 10A and one or more other devices in set 4 (e.g., second device 10A, one or more devices 10C of FIG. 1, etc.). Additionally or alternatively, first device 10A may use communications link 3 to instruct second device 10B to disconnect, end, terminate, or otherwise disable one or more inactive or idle communications links between second device 10B and one or more other devices in set 4 (e.g., first device 10A, one or more devices 10C of FIG. 1, etc.).

As one example, second device 10B may be connected to a third device 10C such as wireless headphones. When the wireless headphones are being used to stream audio data, the wireless link between second device 10B and third device 10C is active and may remain active (e.g., under the assumption that the wearer of the wireless headphones wishes to hear music while asleep). On the other hand, when the wireless headphones are not being used to stream audio data, the wireless link between second device 10B and the wireless earbuds is inactive or idle. First device 10A may instruct second device 10B to disconnect the wireless link with the wireless earbuds to conserve power.

At operation 224, first device 10A may stop performing radio scans and/or advertisement broadcasts for other devices. This may include stopping any current radio scan and/or advertisement broadcast and/or foregoing any future radio scans and/or advertisement broadcasts for a predetermined time period and/or until the user is no longer detected as being asleep. Additionally or alternatively, first device 10A may use communications link 3 to instruct second device 10B to stop performing radio scans and/or advertisement broadcasts for other devices. This may include stopping any current radio scan and/or advertisement broadcast and/or foregoing any future radio scans and/or advertisement broadcasts for a predetermined time period and/or until the user is no longer detected as being asleep. This may serve to reduce the power consumption by first device 10A and/or second device 10B associated with scanning for other devices while the user is asleep, when the user is highly unlikely to wish to connect devices 10A and/or 10B to other devices.

At operation 226, first device 10A may place itself into the power-saving mode. Additionally or alternatively, first device 10A may use communications link 3 to place second device 10B in the power-saving mode. This may serve to further reduce power consumption at devices 10A and 10B.

First device 10A may continue to periodically gather camera data while processing operations 220-226. First device 10A may continue to perform operation 220 while processing operations 222-226. When the camera data indicates that the wearer of first device 10A is awake (e.g., when the IFC data indicates that the wearer has opened their eyes) and/or in response to any other desired trigger condition associated with the user being awake (e.g., motion of first device 10A detected by a motion sensor, receipt of a user input, etc.), processing proceeds to operation 228.

At operation 228 (e.g., responsive to detecting that the user is awake), first device 10A may reverse operations 222-226. For example, first device 10A may reconnect any disconnected idle communications links of first device 10A and/or second device 10B, may resume radio scans and/or advertisements by first device 10A and/or second device 10B, and/or may transition first device 10A and/or second device 10B out of the power-saving mode into a regular-power mode (sometimes also referred to herein as a full-power mode). This may serve to minimize disruptions to user experience in connecting to other devices given the power saving operations 222-226 performed while the wearer was asleep. Alternatively, second device 10B may be omitted and first device 10A may perform operations 222-228 without second device 10B.

Figure 19:
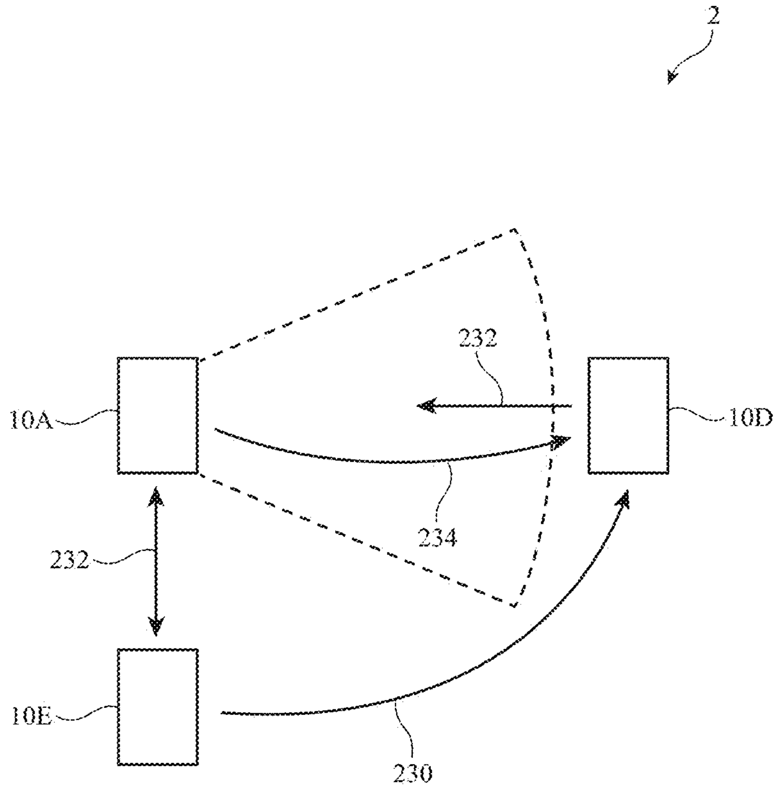
FIG. 19 is a diagram showing how an illustrative head-mounted device may coordinate wireless video streaming between a video transmitting device and a video playback device in accordance with some embodiments.

If desired, first device 10A may help to coordinate wireless streaming of video data between the radio on a video transmitting device and the radio on a video playback device. FIG. 19 is a diagram showing one example of how first device 10A may coordinate wireless streaming of video data between the radio on a video transmitting device and the radio on a video playback device.

The devices 10 in set 4 (FIG. 1) may include a video transmitting device 10E and a video playback device 10D. Video transmitting device 10E may have a stream of video data to be wirelessly played back (streamed) on a display of video playback device 10D. The video data may be a streaming video that is played on a display of video transmitting device 10E and/or may represent a mirror or extension of a desktop, application, or operating system displayed on a display of video transmitting device 10E). Video playback device 10D may have an integrated display to play back the stream of video data and/or may be connected to an external display, monitor, television over a wireless link and/or a wired link (e.g., an HDMI cable, a USB cable, or other cabling) to play back the stream of video data. Video transmitting device 10E may be second device 10B or another device in set 4 (e.g., one of devices 10C of FIG. 1). Video playback transmitting device 10D may be second device 10B or another device in set 4 (e.g., one of devices 10C of FIG. 1).

As shown in FIG. 19, video transmitting device 10E may have a stream of video data 230 to transmit to video playback device 10D (e.g., over a corresponding communications link between devices 10E and 10D) for playback by video playback device 10D. First device 10A may use its captured camera data to seamlessly connect video transmitting device 10E to video playback device 10D. The captured camera data may, for example, include OFC data that includes video playback device 10D and/or IFC data that indicates that the user is focusing their eyes upon video playback device 10D. First device 10A may also use the IFC data to authenticate its wearer (e.g., to match features of the wearer's eyes to the features on the eyes of a registered user). First device 10A may transmit a control signal 232 that instructs video transmitting device 10E to connect to video playback device 10D and/or may transmit a control signal 234 that instructs video playback device 10D to connect to video transmitting device 10E (e.g., without requiring the user to manually configure video transmitting device 10E to connect to video playback device 10D). Once connected, video transmitting device 10E may transmit the stream of video data 230 to video playback device 10D. Video playback device 10D may output images 232 (e.g., frames of video data 230) using a corresponding display.

Figure 20:
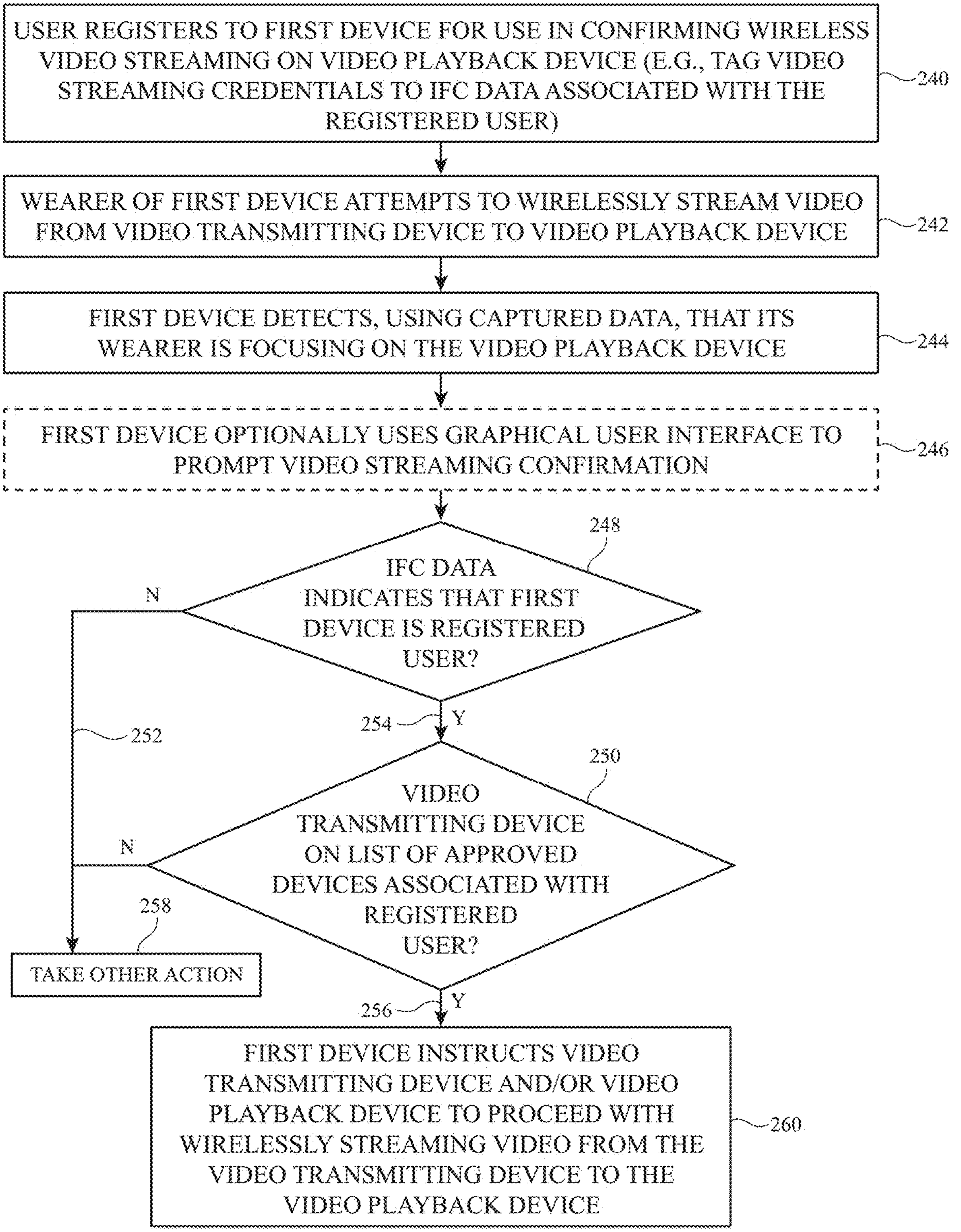
FIG. 20 is a flow chart of illustrative operations involved in using a head-mounted device to coordinate wireless video streaming between a video transmitting device and a video playback device in accordance with some embodiments.

FIG. 20 is a flow chart of operations involved in using first device 10A to coordinate video streaming between video transmitting device 10E and video playback device 10D. The operations of FIG. 20 may be performed while processing operations 82 and 84 of FIG. 6, for example.

At operation 240, a user may register first device 10A for use in confirming wireless video streaming on video playback device 10D. This may include, for example, tagging video streaming credentials associated with the user of set 4 to IFC data (e.g., retinal images or other images associated with the registered user). This association may be stored on first device 10A (e.g., at device database 49 of FIG. 4) and/or remotely (e.g., at database 9 of FIG. 1).

At operation 242, the wearer of first device 10A may attempt to wirelessly stream video data from video transmitting device 10E to video playback device 10D. Video transmitting device 10E may, for example, be a device that has not previously connected to video playback device 10D but that is otherwise registered as a part of the set 4 of devices 10 associated with the user of first device 10A.

At operation 244, first device 10A may detect, based on its captured camera data, that the wearer of first device 10A is focusing their eyes on video playback device 10D. This may, for example, serve as a confirmation that the wearer wishes to connect video transmitting device 10E to video playback device 10D.

At optional operation 246, first device 10A may display one or more GUI elements on its displays 14 (FIG. 2) to prompt the wearer of first device 10A to confirm that the wearer wishes to connect video streaming device 10E to video playback device 10D. Processing may proceed to operation 248 in response to receiving a user input confirming that the wearer wishes to connect video streaming device 10E to video playback device 10D. Alternatively, operation 246 may be omitted.

At operation 248, first device 10A may determine, based on its captured IFC data, whether the wearer of first device 10A is the user registered to first device 10A at operation 240. If/when the wearer is not the registered user, processing may proceed to operation 258 via path 252. If/when the wearer of first device 10A is the user registered to first device 10A, processing may proceed to operation 250 via path 254.

At operation 250, first device 10A may determine, based on its own device database 49 (FIG. 4) or a remote database (e.g., database 9 of FIG. 1) whether video transmitting device 10E is on a list of approved devices associated with the registered user (e.g., whether video playback device 10E is registered as one of the devices 10 in set 4 of FIG. 1). If/when video transmitting device 10E is not on the list of approved devices, processing may proceed to operation 258 via path 252. If/when video transmitting device 10E is on the list of approved devices, this may be indicative of an authorized user attempting to connect one of their own devices (e.g., video transmitting device 10E) to video playback device 10D and processing may proceed to operation 260 via path 256.

At operation 260, first device 10A may transmit control signal 232 to video transmitting device 10E to instruct and/or assist the radio on video transmitting device 10E to connect to (e.g., search for) video playback device 10D and/or may transmit control signal 234 to video playback device 10D to instruct and/or assist video playback device 10D to connect to video transmitting device 10E. Once connected, video transmitting device 10E may proceed to transmit video data 230 to video playback device 10D, which displays the video data as images 232. In this way, the camera data captured by first device 10A may be leveraged to allow the wearer to seamlessly and quickly connect video transmitting device 10E with video playback device 10D even if video transmitting device 10E has never connected to video playback device 10D before and without requiring manual configuration at video transmitting device 10E (e.g., without requiring the user to type in a confirmation code displayed by video playback device 10D into video transmitting device 10E to confirm that video transmitting device 10E is connecting to the correct video playback device rather than some other video playback device within radio range).

At operation 258, video transmitting device 10E may forego connection to video playback device 10D, may prompt the user to manually configure video transmitting device 10E to connect to video playback device 10D (e.g., by typing a code displayed by video playback device 10D into video transmitting device 10E), and/or may perform any other desired operations. Alternatively, video transmitting device 10E may be omitted and first device 10A may transmit video data for display by video playback device 10D (e.g., operation 250 may be omitted).

Figure 21:
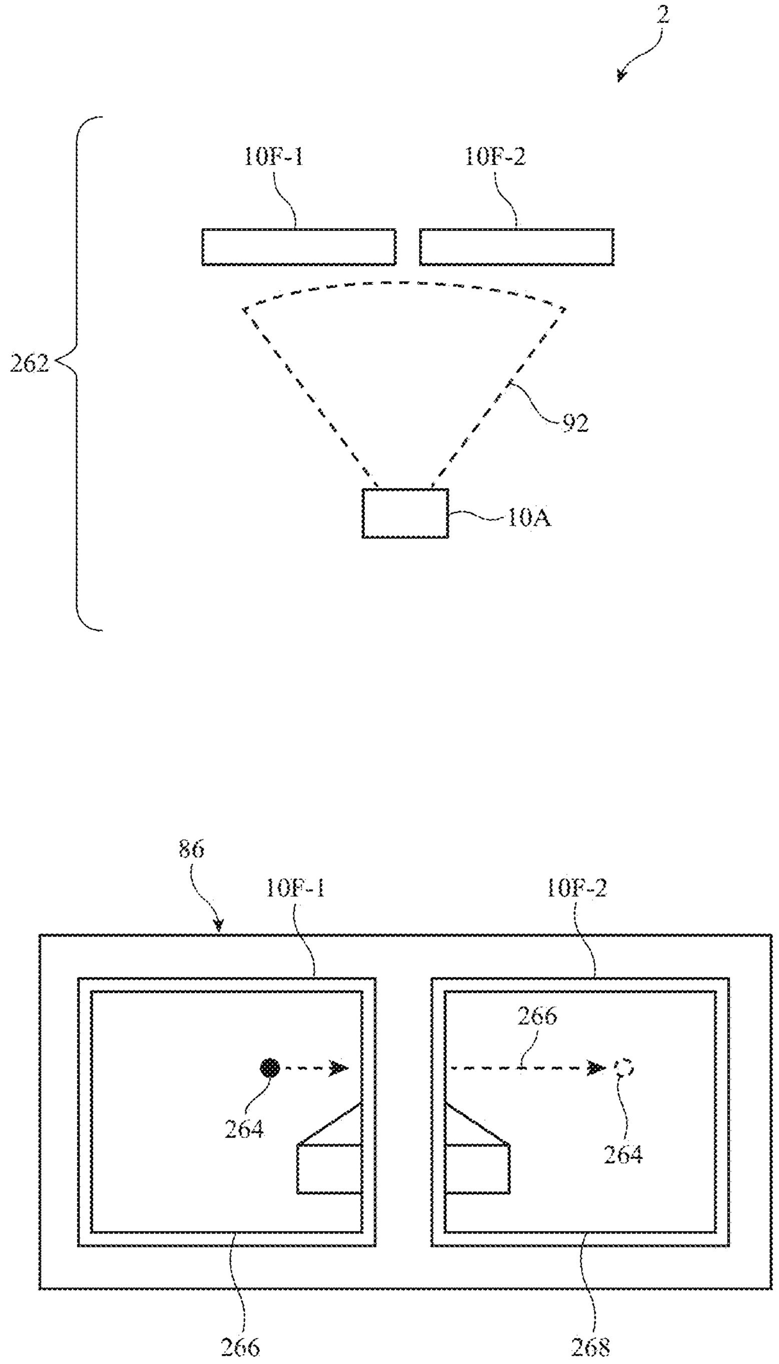
FIG. 21 is a diagram showing how an illustrative head-mounted device may coordinate the display of data on first and second display devices in accordance with some embodiments.

If desired, camera data captured by first device 10A may be used to help coordinate the display of data on first and second display devices within view of first device 10A. FIG. 21 is a diagram showing one example of how first device 10A may coordinate the display of data on first and second display devices. As shown in portion 262 of FIG. 21, communications system 2 may include a first display device 10F-1 and a second display device 10F-2. Second display device 10F-2 may be placed at a particular physical location and orientation with respect to first display device 10F-1. In FIG. 21, for example, second display device 10F-2 is placed to the right of first display device 10F-1. Display devices 10F-1 and 10F-2 may be different devices 10C of set 4 (FIG. 1). Alternatively, one of display device 10F-1 or display device 10F-2 may be formed as a part of second device 10B (e.g., in implementations where second device 10B has an integrated display).

The wearer of first device 10A may view display devices 10F-1 and 10F-2 through first device 10A. Display devices 10F-1 and 10F-2 may therefore be within FOV 92 of the OFCs in first display device 10A. Image 86 of FIG. 21 represents the wearer's view while wearing first device 10A. Image 86 includes images of display devices 10F-1 and 10F-2 (e.g., images of real-world objects captured by the OFCs of first device 10A) and thus any images that are displayed by display devices 10F-1 and 10F-2. As shown in image 86, display device 10F-1 is located to the left of display device 10F-2.

The wearer of first device 10A may wish to display data from a transmitting device on both display devices 10F-1 and 10F-2. The transmitting device may be one of display devices 10F-1 and 10F-2 or another device 10 (not shown in FIG. 1 for the sake of clarity). The data transmitted by the transmitting device may include, for example, a stream of video data such as video data representing a desktop, application, and/or operating system of the transmitting device (e.g., a mirrored or extended desktop, window, or screen).

If desired, the camera data captured by first device 10A may be used to help select/orient the content of the data provided by the transmitting device to display devices 10F-1 and 10F-2. For example, the camera data may be used to identify the relative position between display devices 10F-1 and 10F-2. The transmitting device may then transmit its data to display devices 10F-1 and 10F-2 in a manner that allows for the data to be presented in a continuous manner between display devices 10F-1 and 10F-2 given their relative positions as identified using the camera data (e.g., as a single continuous desktop, window, or workspace between display devices 10F-1 and 10F-2). This may eliminate the need for the wearer of first device 10A to manually inform the transmitting device of the relative position of display devices 10F-1 and 10F-2, which may optimize user experience.

Consider an example in which the transmitting device is a laptop computer that also forms display device 10F-1 and in which display device 10F-2 is an external monitor placed to the right of display device 10F-1. The laptop computer may be connected to the external monitor using a wired link (e.g., an HDMI cable, USB cable, etc.) or a wireless link (e.g., a Bluetooth or WLAN link). In this example, the transmitting device may generate a stream of video data representing the desktop or workspace of the laptop computer (e.g., any windows, applications, files, images, and/or videos displayed as a part of the desktop or workplace). The transmitting device may split or divide the video data into a first portion 266 for display on display device 10F-1 and a second portion 268 for display on display device 10F-2. The transmitting device may display first portion 266 on display device 10F-1 and may transmit second portion 268 to display device 10F-2. Display device 10F-2 may, for example, serve as an extended desktop display for display device 10F-1. Display device 10F-2 may display the second portion 268 of the video data. The content of the first and second portions of the video data may be selected based on the relative positioning between display devices 10F-1 and 10F-2 to ensure that images in the first and second portions of the video data merge seamlessly between display devices 10F-1 and 10F-2 (e.g., such that any images spanning first portion 266 and second portion 268 are correctly aligned between display devices 10F-1 and 10F-2 at the physical boundary between display device 10F-1 and display device 10F-2).

Rather than requiring that the user manually inform the laptop computer of the position of display device 10F-2 relative to display device 10F-1 (e.g., by interacting with on-screen settings menus on the laptop computer), first device 10A may capture OFC data that includes images of both display devices 10F-1 and 10F-2. First device 10A may process the OFC data to identify the position of display device 10F-1 relative to display device 10F-2 (e.g., to identify that display device 10F-2 is located to the right of display device 10F-1). The laptop computer may then generate and transmit suitable content in the first and second portions of the video data to configure images to merge seamlessly between display devices 10F-1 and 10F-2 given their relative positions.

If desired, the transmitting device may also extend a pointer (e.g., a mouse cursor) and/or virtual keyboard between first display device 10F-1 and second display device 10F-2 based on the relative positioning detected by first device 10A. This may, for example, allow the user to move a graphical object such as pointer 264 from display device 10F-1 onto display device 10F-2 in the direction of arrow 266 by simply moving their mouse or trackpad input to the right, as shown by arrow 266. When the position of display device 10F-2 relative to display device 10F-1 is not properly configured (or detected using first device 10A), moving the mouse or trackpad input to the right could cause pointer 264 to enter the image 268 of display device 10F-2 from a misaligned position or even from another side of display device 10F-2, which can make it difficult to use display device 10F-2 as an extended display for display device 10F-1. This may also be extended to other graphical objects such as windows, files, applications, GUI elements, and/or other elements displayed by display devices 10F-1 and 10F-2 (e.g., to allow the elements to be moved from display device 10F-1 onto display device 10F-2 by dragging the elements to the right from display device 10F-1 or vice versa). This example is illustrative and non-limiting. Display device 10F-2 may have any desired position and/or orientation relative to display device 10F-1, which is then detected by first device 10A. This may be extended to more than two display devices. Any desired data may be displayed on display devices 10F-1 and 10F-2.

Figure 22:
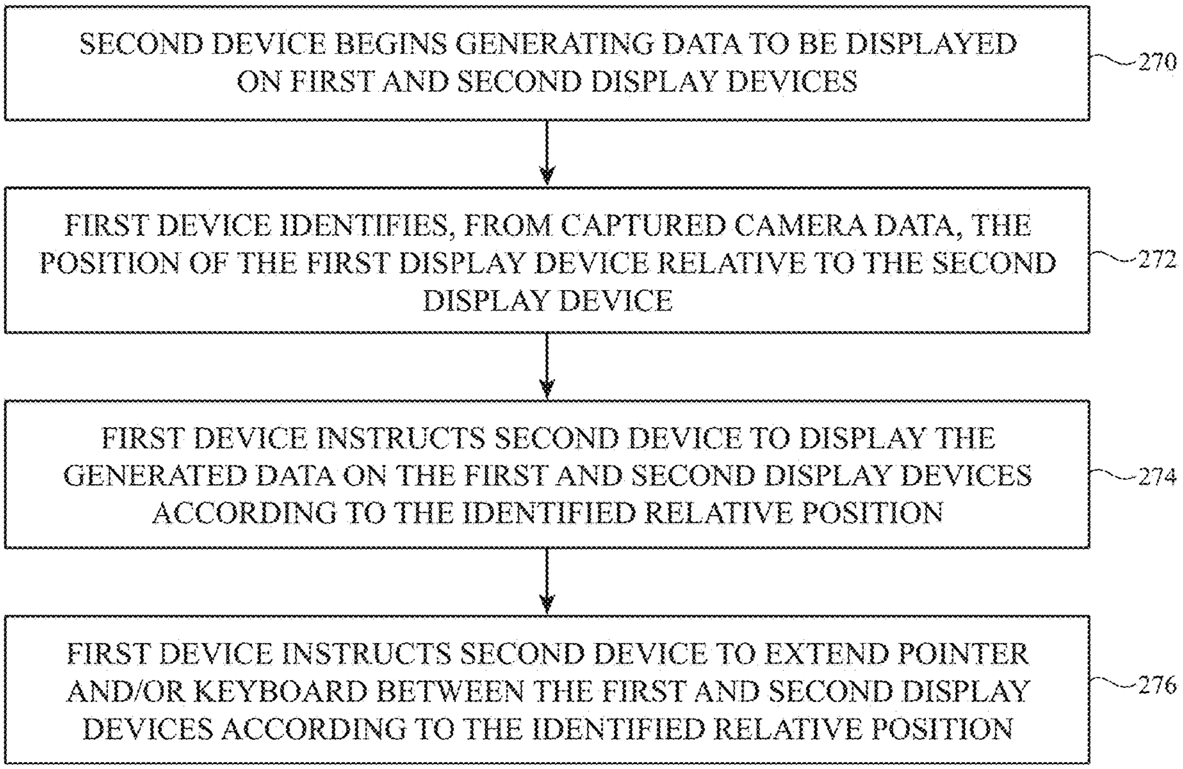
FIG. 22 is a flow chart of illustrative operations involved in using a head-mounted device to coordinate the display of data on first and second display devices in accordance with some embodiments.

FIG. 22 is a flow chart of operations involved in using first device 10A to coordinate the display of data on display devices 10F-1 and 10F-2 of FIG. 21. The operations of FIG. 2 may, for example, be performed while processing operations 82 and 84 of FIG. 6.

At operation 270, a transmitting device (e.g., second device 10B of FIG. 1) may begin generating data to be displayed on first display device 10F-1 and second display device 10F-2.

At operation 272, first device 10A may capture camera data that includes first display device 10F-1 and second display device 10F-2. First device 10A may process the camera data (e.g., OFC data in the camera data) to identify, detect, or determine the position and/or orientation of first display device 10F-1 relative to second display device 10F-2. For example, in the implementation of FIG. 2, first device 10A may identify that first display device 10F-1 is located to the left of second display device 10F-2. If desired, first display 10A may also authenticate one or both display devices (e.g., to ensure that the display device(s) are owned or operated by the same user of set 4).

At operation 274, first device 10A may instruct and/or assist the transmitting device (e.g., second device 10B) to display its generated data on display devices 10F-1 and 10F-2 according to or based on the position of first display device 10F-1 relative to second display device 10F-2 as detected using the captured camera data. This may include, for example, first device 10A transmitting a control signal to the transmitting device that informs the transmitting device of the detected position of first display device 10F-1 relative to second display device 10F-2. The transmitting device may then provide the data to display devices 10F-1 and 10F-2 in a manner that allows the images displayed by display devices 10F-1 and 10F-2 to merge seamlessly given their relative positions (e.g., in respective portions 266 and 268 of FIG. 21). In this way, the signal transmitted by first device 10A may assist the radio on the transmitting device to seamlessly display data on display devices 10F-1 and 10F-2.

At operation 276, which may be performed concurrent with, prior to, or after operation 274, first device 10A may instruct and/or assist second device 10A to extend a pointer (e.g., pointer 264), a keyboard, and/or other inputs or graphical elements between display devices 10F-1 and 10F-2 according to the detected position of display device 10F-1 relative to display device 10F-2. This may allow the pointer, keyboard, and/or other inputs or graphical elements to be seamlessly and logically moved between the display devices in accordance with their relative positions. By using first device 10A to detect the relative positions of display devices 10F-1 and 10F-2, the user of the transmitting device may video the displayed data in a seamless and continuous manner without needing to manually configure or inform the transmitting device of the relative positioning of the display devices, which may optimize user experience.

First device 10A and/or second device 10B may run a reminder application that issues reminders to the user in response to one or more trigger conditions. The reminders may include visual notifications displayed by first device 10A and/or second device 10B, audio notifications played by a speaker on first device 10A and/or second device 10B, and/or haptic notifications produced by a haptic engine on first device 10A and/or second device 10B, as examples. The trigger conditions may be at least partially defined by a user input provided to first device 10A and/or second device 10B.

If desired, first device 10A may help to trigger a reminder based on a particular visual cue. For example, first device 10A and/or second device 10B may receive a user input instructing the device(s) to issue a reminder the next time the user sees a particular friend or goes to a particular store. First device 10A may capture and process camera data. When the processed camera data includes an image of the friend or store, this may trigger first device 10A and/or second device 10B to issue the reminder.

Figure 23:
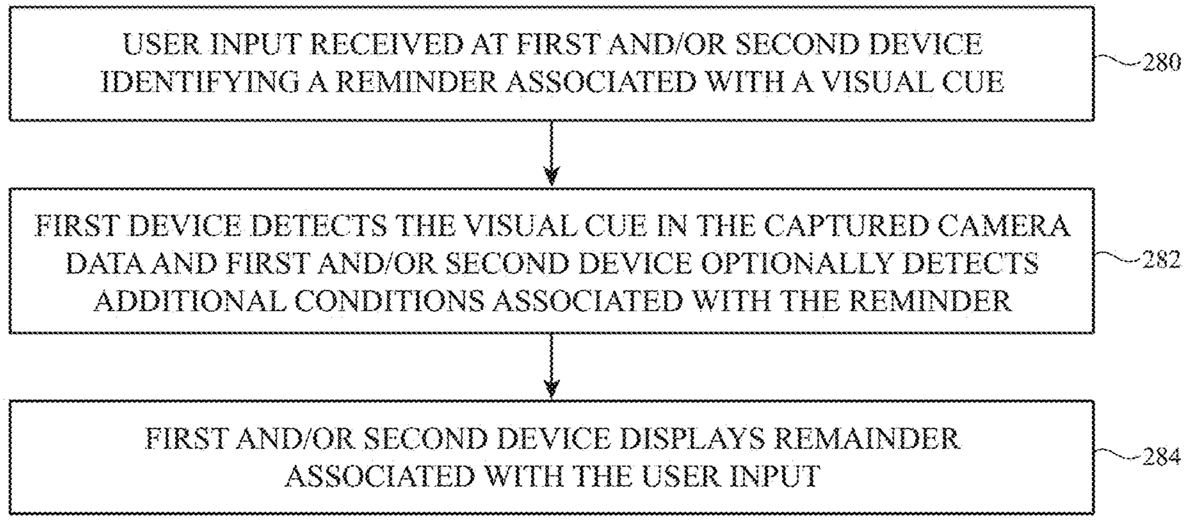
FIG. 23 is a flow chart of illustrative operations involved in using a head-mounted device to trigger a reminder based on a visual cue in accordance with some embodiments.

FIG. 23 is a flow chart of illustrative operations involved in using first device 10A to trigger a reminder based on a visual cue. Operations 280-284 of FIG. 23 may be performed while processing operations 82 and 84 of FIG. 6, for example.

At operation 280, first device 10A and/or second device 10B may receive a user input instructing the device(s) to issue a reminder associated with a particular visual cue. The visual cue may be a particular object or person that can be detected in the camera data captured by first device 10A. If desired, the device(s) may generate a vision card or another data structure that ties a particular visual cue to any corresponding reminders set by the user and/or one or more software applications for that visual cue. If desired, the vision card or other data structure may have a corresponding life span, after which the reminder is deleted.

At operation 282, first device 10A may detect the visual cue in its captured camera data. For example, first device 10A may perform an object detection algorithm on captured OFC data to search the captured OFC data for images of objects associated with the visual cue. If/when the captured OFC data includes images of one or more objects associated with the visual cue, processing may proceed to operation 284. First device 10A may, for example, transmit a signal to second device 10B identifying that first device 10A detected the one or more objects associated with the visual cue and/or any other desired information associated with the vision card (e.g., to assist second device 10B in issuing a notification associated with the reminder). If desired, devices 10A and/or 10B may combine this image-based object detection with one or more other trigger conditions associated with the reminder. For example, when the user inputs a reminder to purchase detergent the next time the user is at a supermarket, devices 10A and/or 10B may use a combination of location information detected by second device 10B (e.g., satellite navigation information indicative of the user being located at a supermarket) and OFC data captured by first device 10A (e.g., images of the supermarket) to be certain that the user has in fact arrived at a supermarket, and processing may proceed to operation 284. The camera data captured by first device 10A may, for example, serve to boost the confidence with which the location information is used to determine whether the reminder should be issued. The camera data may also be used to promote and/or demote radio scan cadence at second device 10B.

At operation 284 (e.g., in response to detection of the visual cue associated with the reminder), first device 10A and/or second device 10B may issue the reminder (e.g., a visual, audible, and/or haptic reminder) associated with the visual cue. If desired, signals may be conveyed between devices 10A and 10B to coordinate and/or trigger the issued reminder. In this way, camera data captured by first device 10A may help to increase the confidence level with which reminders are issued to the user.

As used herein, the term "concurrent" means at least partially overlapping in time. In other words, first and second events are referred to herein as being "concurrent" with each other if at least some of the first event occurs at the same time as at least some of the second event (e.g., if at least some of the first event occurs during, while, or when at least some of the second event occurs). First and second events can be concurrent if the first and second events are simultaneous (e.g., if the entire duration of the first event overlaps the entire duration of the second event in time) but can also be concurrent if the first and second events are non-simultaneous (e.g., if the first event starts before or after the start of the second event, if the first event ends before or after the end of the second event, or if the first and second events are partially non-overlapping in time). As used herein, the term "while" is synonymous with "concurrent."

As described above, one aspect of the present technology is the gathering and use of information such as information from input-output devices. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Computer-generated reality: in contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands). A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects. Examples of CGR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground. Examples of mixed realities include augmented reality and augmented virtuality. Augmented reality: an augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof. Augmented virtuality: an augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Hardware: there are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light sources, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

An apparatus (e.g., an electronic user equipment device, a wireless base station, etc.) may be provided that includes means to perform one or more elements of a method described in or related to any of the methods or processes described herein.

One or more non-transitory computer-readable media comprising instructions to cause an electronic device, upon execution of the instructions by one or more processors of the electronic device, to perform one or more elements of any method or process described herein.

An apparatus comprising logic, modules, or circuitry to perform one or more elements of a method described in or related to any of the method or process described herein.

An apparatus comprising: one or more processors and one or more non-transitory computer-readable storage media comprising instructions that, when executed by the one or more processors, cause the one or more processors to perform the method, techniques, or process as described herein.

A signal, datagram, information element, packet, frame, segment, PDU, or message or datagram may be provided as described in or related to any of the examples described herein.

A signal encoded with data, a datagram, IE, packet, frame, segment, PDU, or message may be provided as described in or related to any of the examples described herein.

An electromagnetic signal may be provided carrying computer-readable instructions, wherein execution of the computer-readable instructions by one or more processors is to cause the one or more processors to perform the method, techniques, or process as described in or related to any of the examples described herein.

A computer program comprising instructions, wherein execution of the program by a processing element is to cause the processing element to carry out the method, techniques, or process as described in or related to any of the examples described herein.

A signal in a wireless network as shown and described herein may be provided.

A method of communicating in a wireless network as shown and described herein may be provided.

A system for providing wireless communication as shown and described herein may be provided.

A device for providing wireless communication as shown and described herein may be provided.

Any of the above-described examples may be combined with any other example (or combination of examples), unless explicitly stated otherwise. The foregoing description of one or more implementations provides illustration and description but is not intended to be exhaustive or to limit the scope of aspects to the precise form disclosed.

The foregoing is merely illustrative and various modifications can be made to the described embodiments. The foregoing embodiments may be implemented individually or in any combination.

What is claimed is:

1. A head-mounted device comprising:

a head-mounted support structure;

a display in the head-mounted support structure and configured to display an image;

one or more cameras in the head-mounted support structure and configured to generate camera data; and a first radio in the head-mounted support structure and configured to adjust, based on the camera data, a second radio of an electronic device that is wirelessly connected to the head-mounted device.

2. The head-mounted device of claim 1, wherein the display is configured to display the image at an eye box at a first side of the head-mounted device, the one or more cameras comprising:

a first camera configured to generate a first portion of the camera data based on light received at a second side of the head-mounted device opposite the first side of the head-mounted device; and a second camera configured to generate a second portion of the camera data based on light received from the eye box.

3. The head-mounted device of claim 2, further comprising:

one or more processors configured to identify a gaze direction based on the second portion of the camera data, wherein the first radio is configured to transmit, in response to the gaze direction overlapping an additional electronic device in the first portion of the camera data for at least a predetermined period, a signal to the electronic device that instructs the second radio to begin searching for the additional electronic device.

4. The head-mounted device of claim 2, wherein the first radio is further configured to:

receive, from the electronic device, a list of additional electronic devices, and transmit, in response to the first portion of the camera data including an additional electronic device from the list, a signal to the electronic device that instructs the electronic device to begin searching for the additional electronic devices in the list.

5. The head-mounted device of claim 2, wherein the first radio is further configured to:

transmit, to the electronic device, a signal identifying a feature of an additional electronic device in the first portion of the camera data, the signal being configured to assist the second radio on the electronic device to search for the additional electronic device based on the feature identified by the signal.

6. The head-mounted device of claim 2, wherein the first radio is further configured to:

receive, from the electronic device, a list of additional electronic devices, and transmit, responsive to receiving a first signal from the electronic device identifying that the electronic device is operating in a power-saving mode, a second signal to the electronic device, wherein the second signal identifies a subset of the additional electronic devices in the list that are absent from the first portion of the camera data, the second signal being configured to assist the second radio on the electronic device to stop searching for the additional electronic devices in the subset identified by the second signal.

7. The head-mounted device of claim 2 wherein, in response to the second portion of the camera data indicating that an eye at the eye box has been closed for at least a predetermined time period, the first radio is configured to transmit a signal to the electronic device that:

instructs the electronic device to disconnect a communications link of the second radio, instructs the electronic device to enter a power-saving mode, or instructs the electronic device to stop performing radio scans and advertisement broadcasts.

8. The head-mounted device of claim 2 wherein, while the first portion of the camera data includes a display of a video playback device, the first radio is configured to transmit a signal to the electronic device that instructs the electronic device to establish a communications link between the second radio and the video playback device, the signal being configured to assist the second radio to transmit a stream of video data to the video playback device over the communications link.

9. The head-mounted device of claim 2, further comprising:

one or more processors configured to identify a relative position between a first display device and a second display device in the first portion of the camera data, wherein the first radio is further configured to transmit, to the electronic device, a signal that identifies the relative position, the signal being configured to assist the second radio on the electronic device to transmit video data to the second display device based on the identified relative position.

10. The head mounted device of claim 2, wherein the first radio is further configured to:

transmit, to the electronic device, a signal identifying that the first portion of the camera data includes data associated with a reminder, the signal being configured to assist the electronic device to issue a notification associated with the reminder in response to receiving the signal.

11. A head-mounted device having a front and a rear, the head-mounted device comprising:

a head-mounted support structure;

a display in the head-mounted support structure and configured to display an image to an eye box at the rear;

a camera in the head-mounted support structure and configured to generate camera data;

an antenna;

a radio communicatively coupled to the antenna and configured to convey wireless data over the antenna; and one or more processors configured to adjust the radio based on the camera data.

12. The head-mounted device of claim 11, wherein the camera is mounted in the head-mounted support structure at the front of the head-mounted device and is configured to generate the camera data in response to light incident upon the front of the head-mounted device.

13. The head-mounted device of claim 12, further comprising:

an additional camera in the head-mounted support structure at the rear of the head-mounted device, the additional camera being configured to generate additional camera data based on light from the eye box, and the one or more processors being configured to adjust the radio based on the additional camera data.

14. The head-mounted device of claim 13, the one or more processors being configured to estimate a gaze location based on the additional camera data and being configured to adjust the radio based on the gaze location.

15. The head-mounted device of claim 11, the one or more processors being configured to adjust the radio by starting or stopping, based on the camera data, a search for an electronic device to wirelessly connect to the radio.

16. A method of operating a head-mounted device, the method comprising:

displaying an image using a display on a head-mounted support structure;

capturing images using one or more cameras on the head-mounted support structure; and using a first radio to adjust, based on the images, a second radio of an electronic device that is wirelessly connected to the head-mounted device.

17. The method of claim 16, wherein the display is at a first side of the head-mounted device and capturing the images comprises:

capturing, using a first camera, a first subset of the images based on light received at a second side of the head-mounted device opposite the first side of the head-mounted device; and capturing, using a second camera, a second subset of the images based on light received at the first side of the head-mounted device.

18. The method of claim 17, wherein using the first radio to adjust the second radio comprises:

transmitting, to the electronic device, a signal identifying a feature of an additional electronic device in the first subset of the images, the signal being configured to assist the second radio on the electronic device to search for the additional electronic device based on the feature identified by the signal.

19. A method of operating a head-mounted device having a front and a rear, the method comprising:

displaying, using a display on a head-mounted support structure, an image to an eye box at the rear of the head-mounted device;

capturing images using a camera on the head-mounted support structure;

conveying wireless data using a radio; and adjusting, using one or more processors, the radio based on the images.

20. The method of claim 19, wherein capturing the images comprises capturing the images based on light incident upon the front of the head-mounted device, the method further comprising:

capturing additional images using an additional camera on the head-mounted support structure based on additional light received at the rear of the head-mounted device, wherein adjusting the radio comprises adjusting the radio based on the additional images.

* * * * *